United States Patent [19]

Zias et al.

[11] Patent Number: 4,996,627
[45] Date of Patent: Feb. 26, 1991

[54] HIGH SENSITIVITY MINIATURE PRESSURE TRANSDUCER

[75] Inventors: Arthur R. Zias, Los Altos; Barry Block, Los Altos Hills; Kenneth W. Mapes, San Jose; Norman L. Nystrom, Sunnyvale; Robert M. Cadwell, Los Altos, all of Calif.

[73] Assignee: Dresser Industries, Inc., Dallas, Tex.

[21] Appl. No.: 304,344

[22] Filed: Jan. 30, 1989

[51] Int. Cl.⁵ .................. H01G 7/00; G25F 3/12; B44C 1/22; H01L 29/84
[52] U.S. Cl. .................. 361/283; 156/628; 156/629; 357/26; 204/129.3
[58] Field of Search .................. 430/326, 309, 331; 437/228; 29/25.41; 338/2, 4, 42; 73/708, 718, 721, 724, 726, 727; 361/283; 357/26, 49; 204/129.3

[56] References Cited

U.S. PATENT DOCUMENTS

| | | | |
|---|---|---|---|
| 3,096,262 | 7/1963 | Shockley | 204/143 |
| 3,232,114 | 2/1966 | Ferran | 73/398 |
| 3,397,278 | 8/1968 | Pomerantz | 174/52 |
| 3,557,621 | 1/1971 | Ferran | 73/398 |
| 3,588,632 | 6/1971 | Nakata | 317/234 |
| 3,713,922 | 1/1973 | Lepselter et al. | 204/143 R |
| 3,738,881 | 6/1973 | Erdman | 156/17 |
| 3,748,571 | 7/1973 | Kurtz | 323/74 |
| 3,757,414 | 9/1973 | Keller | 29/580 |
| 3,758,830 | 9/1973 | Jackson | 317/234 R |
| 3,793,885 | 2/1974 | Frick | 73/398 C |
| 3,800,264 | 3/1974 | Kurtz et al. | 338/2 |
| 3,893,228 | 7/1975 | George et al. | 317/235 M |
| 3,938,175 | 2/1976 | Jaffe et al. | 357/26 |
| 3,941,629 | 3/1976 | Jaffe | 156/8 |
| 3,951,707 | 4/1976 | Kurtz et al. | 156/3 |
| 4,023,562 | 5/1977 | Hynecek et al. | 128/2.05 E |
| 4,040,118 | 8/1977 | Johnston | 361/283 |
| 4,071,838 | 1/1978 | Block | 338/47 |
| 4,072,057 | 2/1978 | Yasuhara et al. | 73/718 |
| 4,079,508 | 3/1978 | Nunn | 29/580 |
| 4,113,551 | 9/1978 | Bassous et al. | 156/662 |
| 4,121,334 | 10/1978 | Wallis | 29/589 |
| 4,127,840 | 11/1978 | House | 338/4 |
| 4,158,311 | 6/1979 | Yasuhara et al. | 73/718 |
| 4,172,005 | 10/1979 | Muraoka et al. | 156/647 |
| 4,184,189 | 1/1980 | Davis et al. | 361/283 |
| 4,188,258 | 2/1980 | Mounteer et al. | 156/628 |
| 4,204,185 | 5/1980 | Kurtz et al. | 338/4 |
| 4,212,191 | 7/1980 | Ethridge | 73/861.47 |
| 4,236,137 | 11/1980 | Kurtz et al. | 338/4 |
| 4,256,532 | 3/1981 | Magdo et al. | 156/628 |
| 4,257,274 | 3/1981 | Shimada et al. | 73/718 |
| 4,261,086 | 4/1981 | Giachino et al. | 29/25.41 |
| 4,275,406 | 6/1981 | Muller et al. | 357/26 |

(List continued on next page.)

OTHER PUBLICATIONS

I.B.M. Technical Disclosure Bulletin Dec. 1967, vol. 10, No. 7, pp. 941.
A MOS Switched-Capacitor Interface for Capacitive Pressure Sensors, Y. E. Park, Yong Eue, Ph.D. Dissertation, University of Michigan, Aug. 1983.

(List continued on next page.)

Primary Examiner—Donald A. Griffin

[57] ABSTRACT

A miniature transducer having an ultrathin tensioned silicon diaphragm so as to be responsive to extremely small changes in pressure. A silicon wafer is masked to define diaphragm areas, and etched to form a setback or capacitor gap a predefined depth. The mask is removed, and the entire silicon wafer is etched a second time to achieve the desired diaphragm thickness. The first and second etches are carried out independently, and thus the capacitor gap and diaphragm thickness can be independently formed. Mask and metallizing steps are carried out on glass wafers, and sandwiched around the processed semiconductor wafer, whereupon a large number of the miniature transducers are fabricated simultaneously. Unique patterning, etching and metallizing steps carried out on the sandwich structure allow a number of quadrature unit cells to be formed, thereby maximizing the area of the semiconductor and glass structures. By proper selection of materials, the diaphragm is tensioned during the fabrication of the transducer structures.

292 Claims, 8 Drawing Sheets

U.S. PATENT DOCUMENTS

| | | | |
|---|---|---|---|
| 4,314,226 | 2/1982 | Oguro et al. | 338/4 |
| 4,332,000 | 5/1982 | Petersen | 361/283 |
| 4,364,276 | 12/1982 | Shimazoe et al. | 73/721 |
| 4,384,899 | 5/1983 | Myers | 148/1.5 |
| 4,390,925 | 6/1983 | Freud | 361/283 |
| 4,415,948 | 11/1983 | Grantham et al. | 361/283 |
| 4,424,713 | 1/1984 | Kroninger, Jr. et al. | 73/718 |
| 4,443,293 | 4/1984 | Mallon et al. | 156/647 |
| 4,445,383 | 5/1984 | Binder et al. | 73/718 |
| 4,495,820 | 1/1985 | Shimada et al. | 73/724 |
| 4,503,709 | 3/1985 | Ruhle | 73/727 |
| 4,525,766 | 6/1985 | Petersen | 361/283 |
| 4,530,029 | 7/1985 | Beristain | 361/283 |
| 4,542,435 | 9/1985 | Freud et al. | 361/283 |
| 4,556,629 | 12/1985 | Poulin et al. | 430/326 X |
| 4,571,661 | 2/1986 | Hoshino | 361/283 |
| 4,578,735 | 3/1986 | Knecht et al. | 361/283 |
| 4,581,676 | 4/1986 | Baxter et al. | 361/283 |
| 4,584,885 | 4/1986 | Cadwell | 73/362.61 |
| 4,586,109 | 4/1986 | Peters et al. | 361/283 |
| 4,589,952 | 5/1986 | Behringer et al. | 156/628 |
| 4,597,003 | 6/1986 | Aine et al. | 357/26 |
| 4,600,934 | 7/1986 | Aine et al. | 357/26 |
| 4,609,966 | 9/1986 | Kuisma | 361/283 |
| 4,612,599 | 9/1986 | Ziegler | 361/283 |
| 4,617,606 | 10/1986 | Shak et al. | 361/283 |
| 4,628,403 | 12/1986 | Kuisma | 361/283 |
| 4,638,552 | 1/1987 | Shimbo et al. | 357/49 X |
| 4,664,762 | 5/1987 | Hirata | 204/129.3 |
| 4,671,846 | 6/1987 | Shimbo et al. | 156/629 |
| 4,671,846 | 6/1987 | Shimbo et al. | 361/283 |
| 4,730,496 | 3/1988 | Knecht et al. | 361/283 X |
| 4,745,521 | 5/1988 | Filho | 361/521 X |
| 4,783,237 | 11/1988 | Aine et al. | 437/15 |
| 4,784,721 | 11/1988 | Holmen et al. | 338/2 X |
| 4,905,575 | 3/1990 | Knecht et al. | 92/103 SD |

OTHER PUBLICATIONS

A MOS Switched-Capacitor Readout Amplifier for Capacitive Pressure Sensors, Y. E. Park and K. D. Wise, IEEE, 1983.

A High-Performance Silicon Tactile Imager Based On A Capacitive Cell, Kukjin Chun and Kensall D. Wise, IEEE, 1985.

Properties of Electromechanical Device Utilizing Thin Silicon Diaphragms, S. Pennington, I. Dillinger and H. Guckel, University of Wisconsin-Madison (undated).

Chemical Milling, the Technology of Cutting Materials by Etching, William T. Harris, 1976.

A Batch-Fabricated Silicon Accelerometer, by Lynn Michelle Roylance and James B. Angell, IEEE Transactions on Electron Devices, vol. Ed-26, No. 12, Dec. 1979.

The Design of an Integrated Circuit Capacitive Pressure Transducer, Thomas M. Grill, Case Western Reserve University, May, 1978.

A Minimum Step Fabrication Process for the All-Silicon Channeling Mask, Atkinson et al., J. Vac. Sci. Technol. B5 (1), Jan./Feb. 1987.

Anamalous Diffusion of Phosphorous into Silicon, Yagi et al., Japanese Journal of Applied Physics, vol. 9, No. 3, Mar. 1970.

A Study of Strain in Ion Implanted Silicon, Sasaki et al., Semiconductor Processing (undated).

X-Ray Measurement of Lattice Strain Induced by Impurity Diffusion, Noboru Sato, Journal of the Physical Society of Japan, vol. 38, No. 1, Jan. 1975.

Sub-Miniature Pressure and Acceleration Transducers, Neubert et al., Control, Jul. 1961.

Solid-State Pressure Sensors, Perrino, Sensors, Jul., 1986.

Solid-State Capacitive Pressure Transducers, Sensors and Actuators, 10 (1986), pp. 303-320.

Diaphram Thickness Control in Silicon Pressure Sensor Using an Anodic Oxidation Etch-Stop, Hirata et al., J. ElectroChem. Soc.: Solid-State Science and Technology, vol. 134, No. 8, pp. 2037-2041, Aug. 1987.

Bonding Techiques for Solid State Pressure Sensors, Thomas A. Knecht (Undated).

Thin Film Technology, Berry et al., D. Van Nostrand Company, Inc., 1968.

Instrument Transducer, Hermann K. P. Neubert, pp. 286-290, 1963.

Integration Brings a Generation of Low-Cost Transducers, Electronics, Dec. 4, 1972, Arthur R. Zias and William F. J. Hare.

Structural Isolation of a Constrained Diaphragm, Instruments and Control Systems, Apr. 1972.

Solid-State Digital Pressure Transducer, IEEE Transactions on Electron Devices, vol. Ed-16, No. 10, Oct. 1969, Arthur R. Zias et al.

Miniature Pressure Transducers with a Silicon Diaphragm, Phillips Tech., Rev. 33, pp. 14-20, 1973, No. 1.

An IC Piezoresistive Pressure Sensor for Biomedical Instrumentation, IEEE Transactions on Biomedical Engineering, vol. BME-20, No. 2, Mar. 1973.

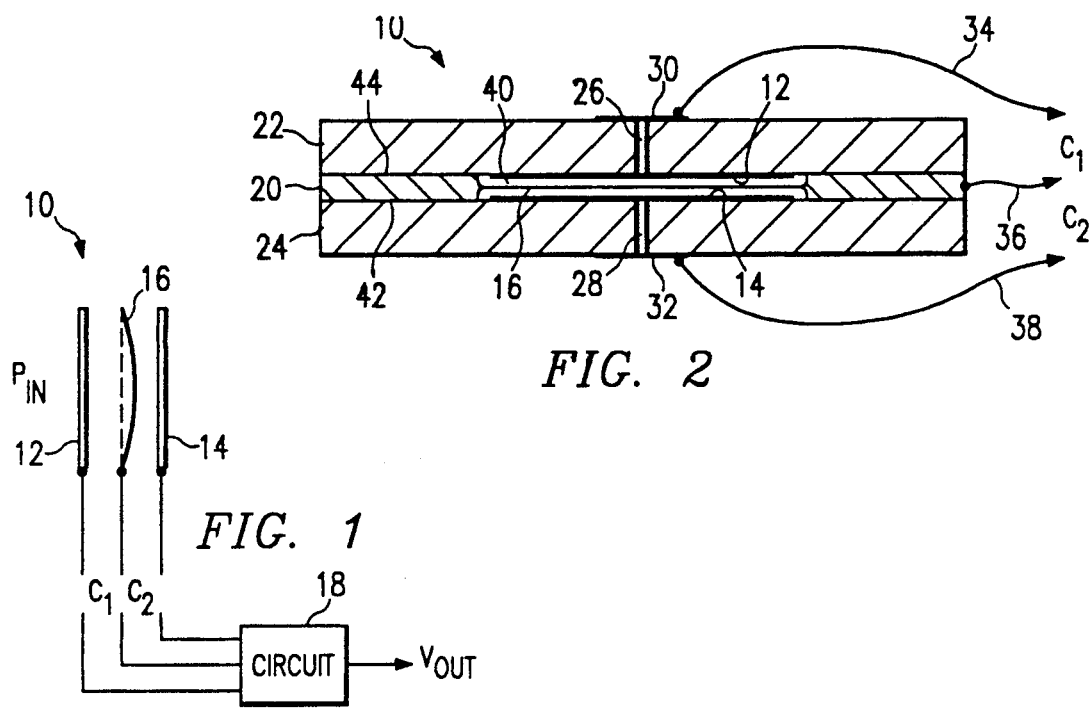
FIG. 1
FIG. 2
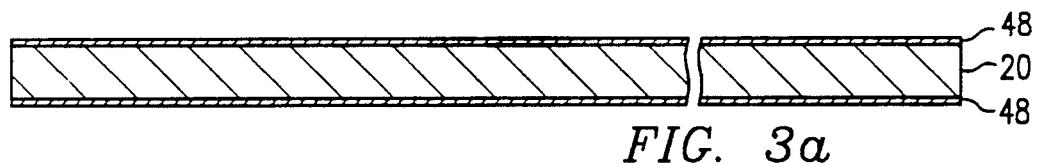
FIG. 3a
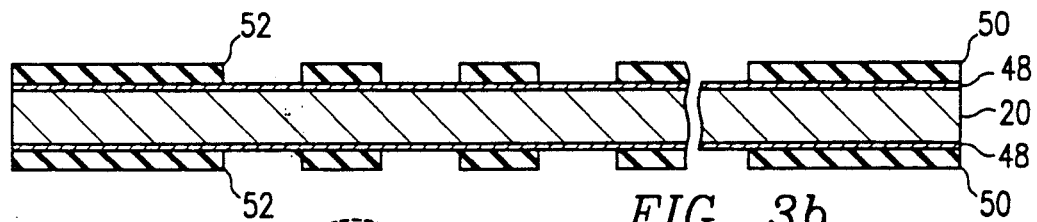
FIG. 3b
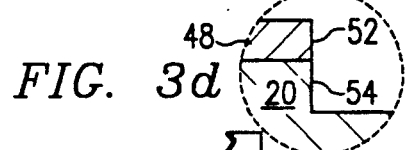
FIG. 3d
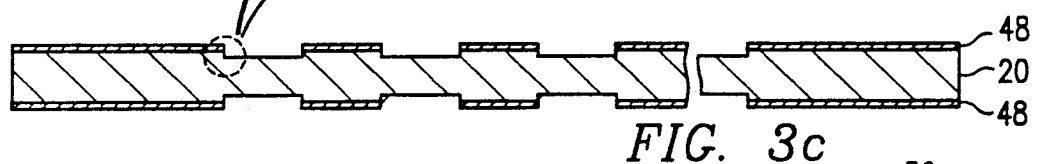
FIG. 3c
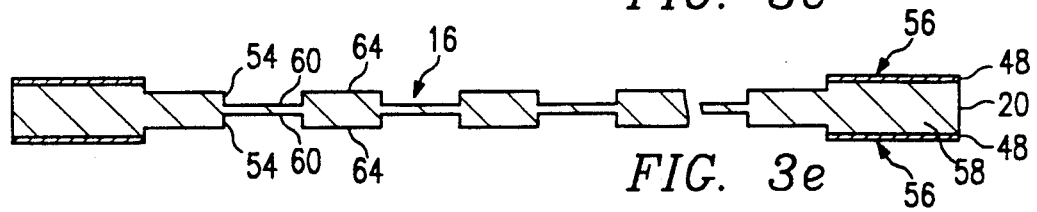
FIG. 3e

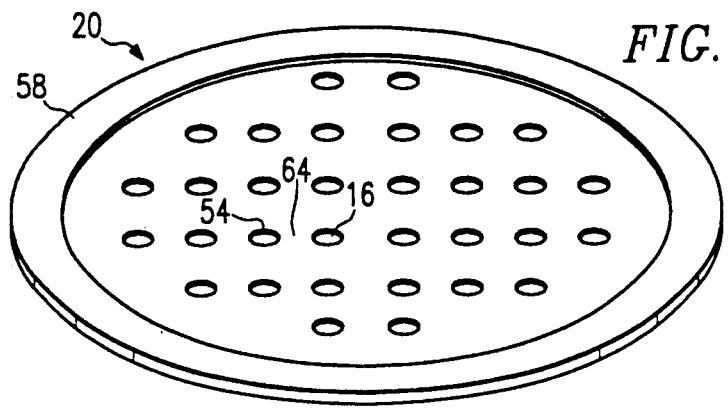
FIG. 4a
FIG. 4b
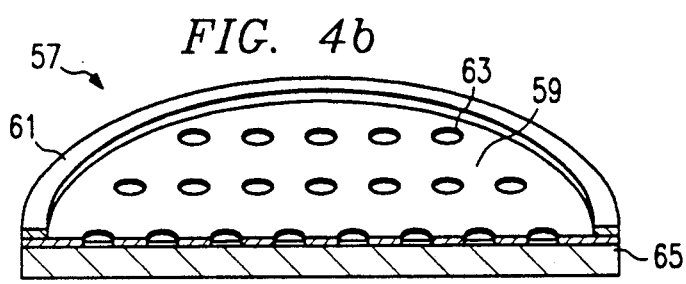
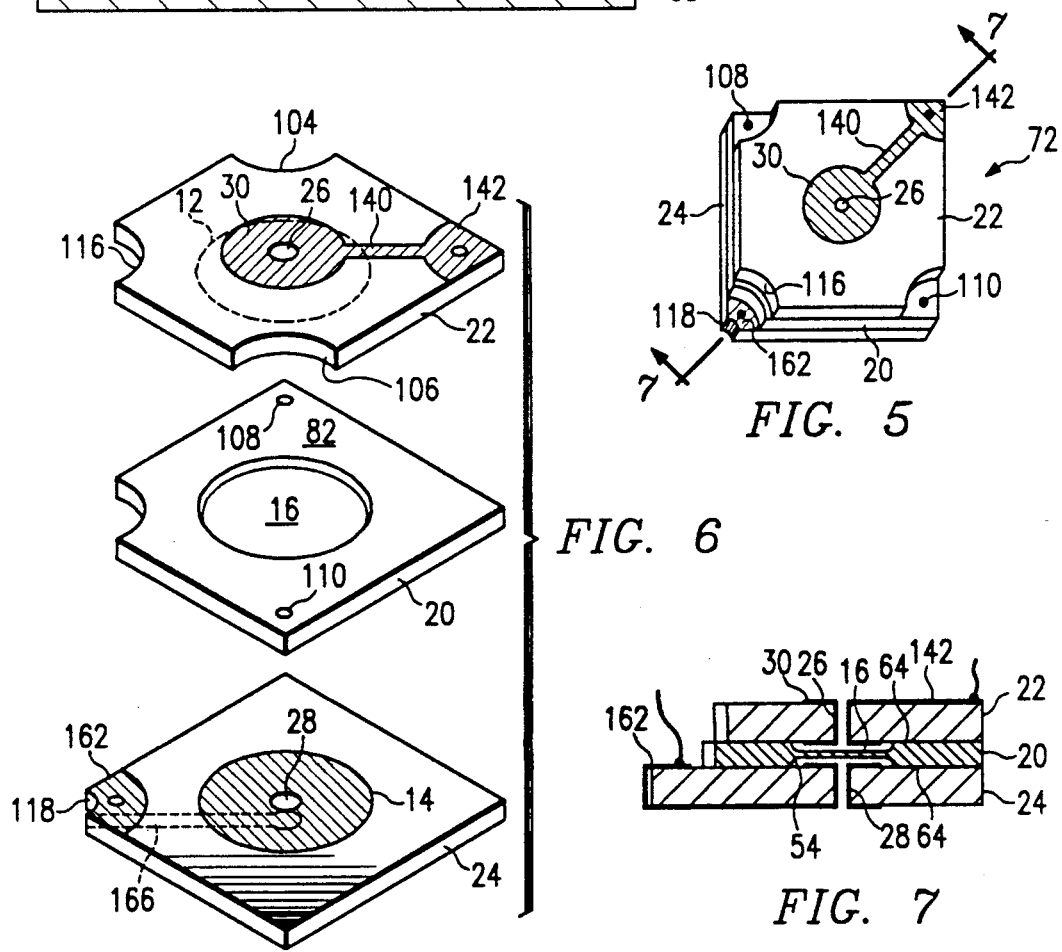
FIG. 5
FIG. 6
FIG. 7

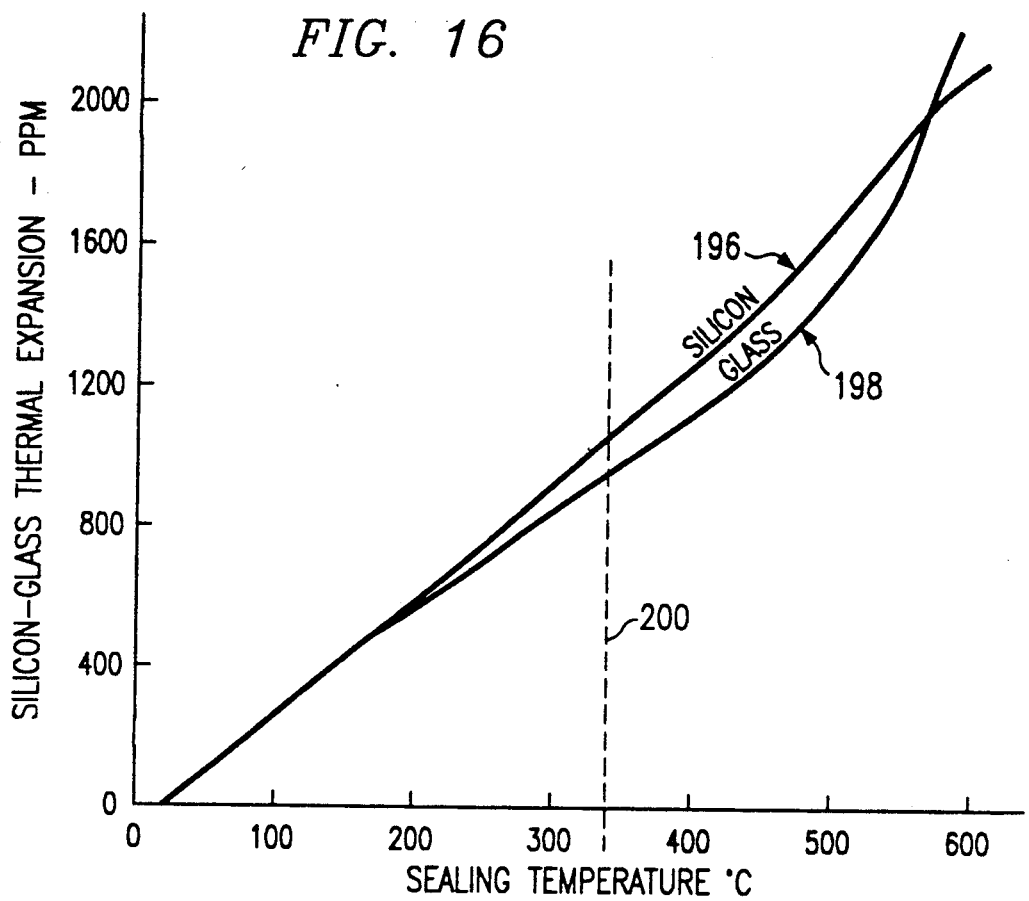
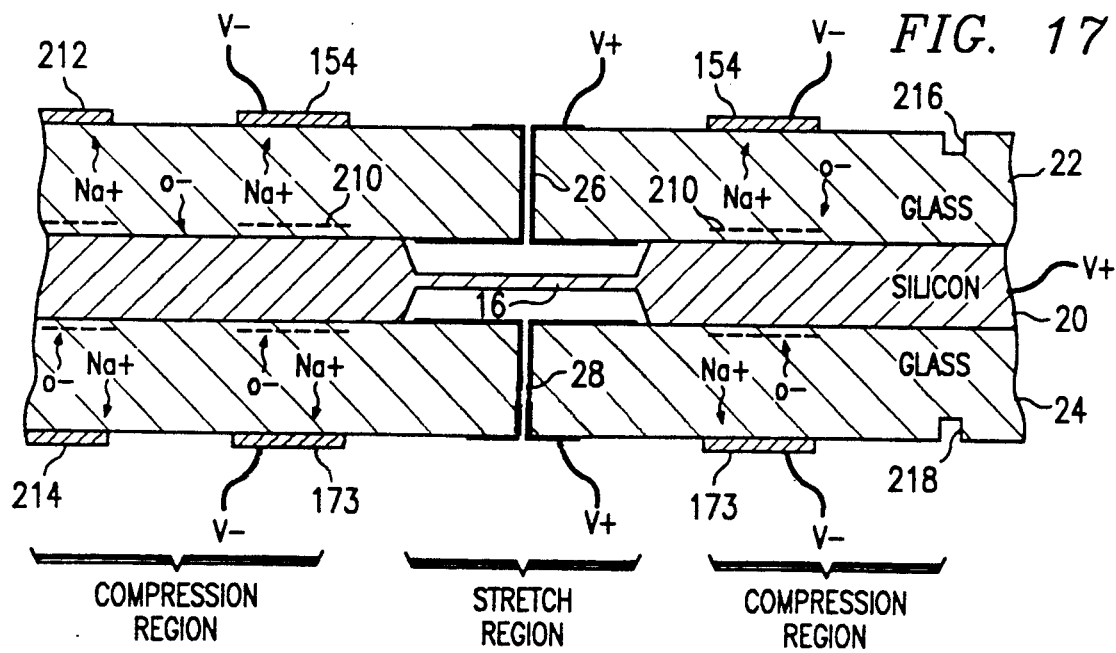

HIGH SENSITIVITY MINIATURE PRESSURE TRANSDUCER

TECHNICAL FIELD OF THE INVENTION

The present invention relates in general to transducers, and more particularly to silicon diaphragm pressure transducers and methods of fabrication thereof

BACKGROUND OF THE INVENTION

Transducers are devices which function generally to convert an input of one form into an output of another form or magnitude. Many types of transducers are available for converting light to electrical signals, mechanical energy to electrical signals, temperature to pressure, pressure to electrical signals, etc., and vice versa. In other instances, transducers can simply modify an input stimulus, such as change an input pressure to another pressure, an input amplitude to a different output amplitude, etc. Equipment or apparatus which operates between different types of energy generally requires one type of transducer or another. Based upon the application, transducers can range from inexpensive to very expensive, depending on the precision, accuracy, reliability, etc. required In the present market, the largest number of pressure to voltage conversion devices (pressure transducers) are piezoresistive. These devices are strain sensitive rather than displacement sensitive. However, for pressure ranges less than a psi FS (Full Span), capacitive displacement transducers are predominantly employed. The capacitance is sensed by electrical circuits to provide an output voltage corresponding to the change in pressure. Highly developed silicon semiconductor processing techniques have given rise to the use of such material as flexible clamped transducer diaphragms which move in response to pressure and provide an output change in electrical resistance or capacitance. Such transducers are disclosed in U.S. Pat. Nos. 4,495,820; 4,424,713; 4,390,925 and 4,542,435. The use of silicon semiconductor material as a pressure transducer diaphragm is a relatively new innovation, and thus many fabrication and operational uncertainties still exist For example, the characterization and mathematical modeling of silicon, when employed as a flexible membrane, is not well known. Therefore, it has been difficult to predict silicon diaphragm transducer performance which exhibits predefined characteristics over a wide range of applications. In addition, the fabrication of such type of transducer has been accompanied by many problems, one of which is that such a conductive diaphragm of the clamped type must be fixed or anchored at its peripheral edge, and electrically insulated from spaced capacitor plates Such an interface requires different materials with the attendant problems of attachment, relative temperature expansion, uniform spacing, stability, reliability and a host of other concerns The demand for pressure transducers with increased sensitivity has always been high because the market for flow transducers using differential pressure techniques has always been larger than the entire pressure transducer market. This market has been largely unserved for lack of low cost, high sensitivity differential pressure transducers. Recently, this already high demand has been growing because energy conservation and control needs in the heating ventilation and air conditioning area (HVAC) have required more sensitive, precise and accurate flow transduction at a lower cost.

In capacitive displacement type transducers, such increased sensitivity is generally achieved by increasing the diameter of the flexible diaphragm. As a result, large diaphragm diameters have been utilized to provide the desired sensitivity. It can be appreciated that with such a construction, such transducers are costly, not easily mass produced and require a lot of space for implementation. In addition, with large diameter diaphragms, the use of silicon makes the transducer economically impractical. Among other disadvantages of many large, metal diaphragm transducers is that an overpressure, even momentarily, often stretches or completely damages the diaphragm and renders the transducer unusable The typical overpressure (proof pressure) for psi ranged transducers is from 1 to 10 times FS. The required overpressure for high sensitivity differential pressure transducers in flow applications is often 10 to 100 times FS and occasionally 1000 times FS. These needs cannot be met by large diameter metal diaphragm devices with proportionally larger gaps.

It can be seen that a need exists for a miniature pressure transducer of the capacitive displacement type which is cost effective and mass producible employing new silicon fabrication and micromachining processes at a wafer level. A need also exists for a miniature transducer, and method of fabrication thereof, in which the sensitivity is not compromised based on size, and in which a large number of transducers can be fabricated in a batch process utilizing semiconductor masking, patterning and deposition technology. There also exists a need for a highly sensitive, small diameter diaphragm which can be overpressured without damage to the unit.

SUMMARY OF THE INVENTION

In accordance with the present invention, the disclosed miniature capacitive displacement pressure transducer, and method of fabrication thereof, substantially reduces or eliminates the disadvantages and shortcomings associated with the corresponding prior art structures and techniques The three layer transducer of the invention is extremely small, e.g., about 300 mil square, with about 200 mil diameter ultrathin diaphragm, and having a sensitivity to pressure changes not heretofore realized by comparably sized transducers.

According to the invention, the transducer diaphragm comprises a thin single crystal silicon material which is processed in a manner to independently define a capacitor gap parameter and a diaphragm thickness. As an example, the silicon wafer is masked and patterned with silicon dioxide to define plural circular diaphragm areas. The patterned silicon material is then quick etched with a potassium hydroxide etchant to remove residual surface oxides, then followed by an initial quaternary ammonium hydroxide etch to remove the patterned silicon to a desired setback or gap depth. The entire silicon dioxide mask is then removed, whereupon the entire wafer is again quick etched with potassium hydroxide followed with a subsequent quaternary ammonium hydroxide etch until a desired thickness of the silicon is reached in the diaphragm areas. The setback or gap depth is not substantially affected by the second etch, thereby independently forming the setback and diaphragm thickness parameters. This etchant does not selectively change setback etch depth at the diaphragm boundaries, as do other etches, thereby yielding a uniform etch depth over the diaphragm area. The thicker silicon areas surrounding the thin diaphragms are also micromachined during the second etch to provide an ideal smooth surface which facilitates electrostatic bonding to glass wafers. Because of the resulting ultrathin silicon structure, the wafer is delicate and easily broken. Thus, an area of the wafer can remain masked and not subject to etching so that a certain degree of wafer rigidity is retained to facilitate handling of the wafer.

Substantial overpressuring of the ultrathin silicon diaphragm neither results in its breaking nor causes hysteresis or other anelastic behavior. The nature of deflection in ultrathin diaphragms is such that strain remains low for displacements much greater than diaphragm thickness. Thus, in the case of ultrathin silicon, the diaphragms can be deflected many times their thickness, and allowed to completely deflect in abutment against the capacitor plate during overpressure. The key benefit of the use of ultrathin silicon is that the resulting diaphragm can be small in diameter even when designed for very low pressure ranges. The sensor size is in turn also small. Thus, many such sensors can be made within a batch processed silicon wafer. The high number of sensors on a single wafer is key to low unit cost.

A pair of borosilicate glass substrates are processed by forming holes therein and metallized patterns to define capacitor plates, edge contact surfaces, and interconnecting conductors. In the preferred form of the invention, the conductor paths are formed such that connections to the miniature transducer can be effected from one side of the ultrathin device. The glass substrates are sandwiched to the processed silicon wafer and subjected to an electrostatic sealing process for hermetically bonding the glass substrates to the semiconductor wafer in a sandwiched manner. The individual diaphragms of the silicon wafer are thus clamped to the glass substrates. A borosilicate glass composition is utilized having the same thermal coefficient of linear expansion as that of silicon in an operational temperature range, but a lower coefficient in a sealing or bonding temperature range. The glass substrates are electrostatically sealed to the silicon wafer and allowed to cool to an operating temperature. Each ultrathin silicon diaphragm is thereby automatically pretensioned, partially by the suitably chosen difference in expansion between the silicon and glass. Special metal patterned areas on each glass substrate are effective during the electrostatic sealing process to confine the electrostatic field to certain areas, thereby controlling a molecular movement of material and also prestressing the diaphragms to a desired extent. Because the bulk of the trilevel transducer structure is glass, the glass characteristics control the thermal expansion and contraction properties of the sandwiched structure. This is in contrast with the prior art structures identified in the patents noted above.

Both glass substrates and the silicon semiconductor wafer are processed to form an array of quadrature unit cells. Each unit cell defines four transducer die structures which are patterned, etched and processed to maximize the wafer area. The forming of holes in the glass substrates and the metallic deposition thereof provides conductors from one side of the substrates to the other to allow electrical circuit connections to only a single side of the transducer.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which:

FIG. 1 is a simplified illustration of a pressure transducer having a flexible diaphragm for providing an output change in capacitance in response to an input change in pressure;

FIG. 2 is a cross-sectional view of a generalized trilevel transducer structure of the clamped diaphragm capacitive displacement type;

FIGS. 3a-3e are sectional views of a semiconductor wafer as it undergoes the various steps of fabrication in the formation of ultrathin diaphragms;

FIG. 4a is an isometric view of a rimmed semiconductor wafer after processing in accordance with the invention;

FIG. 4b is a rimmed semiconductor wafer formed with epitaxial processes;

FIG. 5 is an isometric view of a trilevel transducer constructed in accordance with the preferred embodiment of the invention;

FIG. 6 is an isometric view of the various composite layers of the transducer of FIG. 5, shown in exploded form;

FIG. 7 is a sectional view of the transducer of FIG. 5, taken along line 7—7 thereof;

FIG. 16 illustrates in graphical form the relationship of the coefficients of thermal expansion of the glass substrates and silicon wafers, in the operating and sealing temperature ranges;

FIG. 17 illustrates a portion of the trilevel transducer structure and the ionic movement believed to occur during the electrostatic sealing operation.

DETAILED DESCRIPTION OF THE INVENTION

Figure 8:
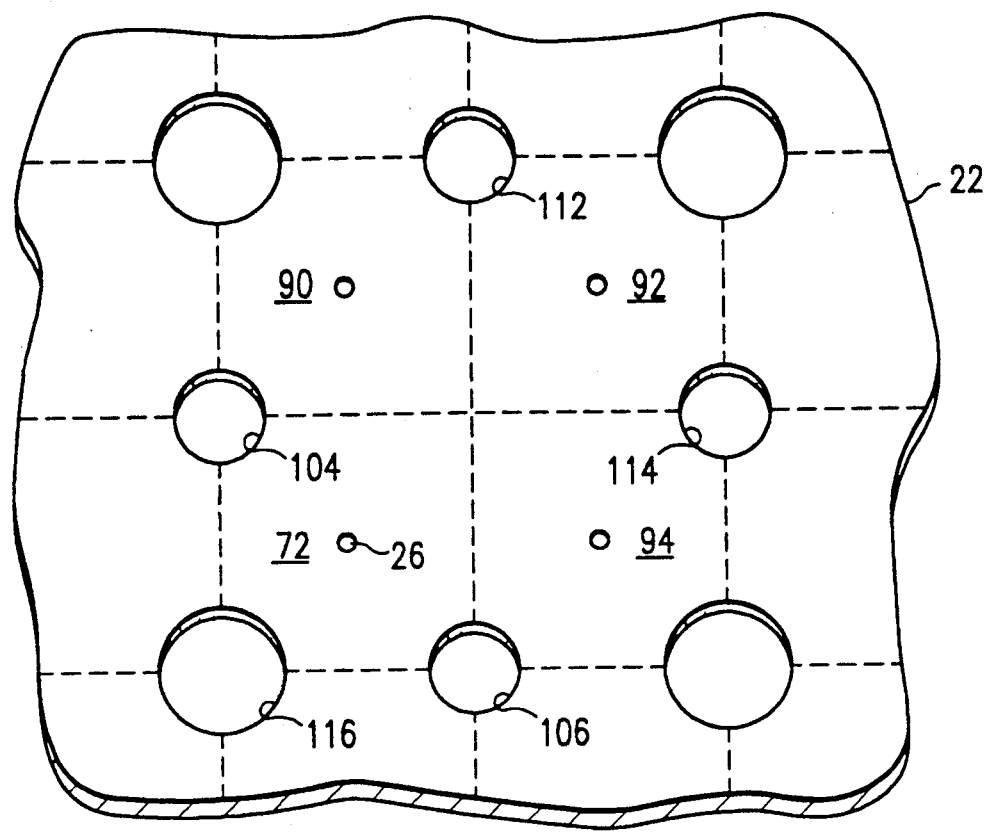
FIGS. 8 and 9 are top views of portions of the top and bottom glass substrates showing the hoes formed therein to define the quadrature unit cells.

FIG. 1 illustrates a simplified diagram of a pressure transducer which is responsive to an input pressure $P_{in}$ to provide an output electrical signal designated $V_{out}$. The transducer includes a device 10 having a pair of spaced apart conductive plates 12 and 14 defining capacitor plates, and a flexible diaphragm or membrane 16. The diaphragm 16 is shown deflected as it would appear in response to a fluid pressure, from a rest or quiescent position, shown in broken line. In practice, the diaphragm 16 comprises a circular membrane fixed or clamped around its periphery, but otherwise allowed to deflect in its interior part in response to the input pressure. A first capacitance C1 exists between capacitor plate 12 and diaphragm 16. In like manner, a second capacitance C2 exists between capacitor plate 14 and diaphragm 16. When the diaphragm 16 deflects in the manner shown, the capacitance C1 decreases, while the capacitance C2 increases, thereby generating a differential capacitance relationship. The capacitances C1 and C2 change inversely according to the following relationship:

$$C = \frac{A}{D} \times \epsilon$$

where A is the area of the capacitor plates, D is the distance between the diaphragm 16 and each capacitor plate, and $\epsilon$ is the dielectric constant of the insulator between the diaphragm 16 and the capacitor plates 12 and 14. Because the increase in the capacitance C2 is not the same magnitude as the decrease in capacitor C1, as the diaphragm 16 deflects in the direction shown, the differential output capacitance of the device 10 is nonlinear for any change or deflection in the diaphragm 16 as a result of fluid pressure applied thereto. In any event, an electrical circuit 18 has inputs connected by conductors to the capacitor plates 12 and 14 as well as to the diaphragm 16. The circuit 18 is responsive to the change in capacitances C1 and C2 to provide an output voltage $V_{out}$ which, in the preferred form of the invention, comprises a voltage having a linear relationship with the pressure $P_{in}$. The circuit techniques employed to achieve a linear characteristic between the output voltage of the circuit 18 and the pressure input of the transducer device 10, and the independency of the output based upon stray or parasitic capacitance and circuit components, are described in detail in copending U.S. patent application entitled "Precision Transducer Circuit and Linearization Method", bearing Ser. No. 304,359, filed concurrently herewith. The disclosure of such application is incorporated herein by reference. As can be appreciated, the transducer of FIG. 1 may be employed in a variety of applications in which pressures are to be converted into corresponding output voltages or currents. As such, the voltage $V_{out}$ of the transducer can be utilized as feedback in a system to control the pressure and thereby form a closed loop circuit, or to control other apparatus or parameters.

FIG. 2 illustrates in more detail the trilevel transducer device 10 of the invention. The flexible diaphragm 16 comprises an ultrathin silicon membrane fabricated as part of a peripheral silicon support structure 20. Importantly, the silicon membrane 16 is pretensioned in a special manner described below, primarily to prevent buckling. The silicon support structure 20 is hermetically sealed at opposing micromachined surfaces between insulator substrates 22 and 24 which, in the preferred embodiment of the invention, comprise a borosilicate type of glass. The sealing of the silicon support structure 20 essentially clamps the diaphragm 16 around its peripheral edge to the insulators 22 and 24.

The capacitor plates 12 and 14 are formed as conductor coatings on the glass substrates 22 and 24 which are sputtered or otherwise deposited by conventional techniques on the inner surfaces of the glass substrates 22 and 24. Holes 26 and 28 are formed through the glass substrates 22 and 24 to allow gases or liquids to apply a pressure on the diaphragm 16 and thereby deflect it toward one or the other of the capacitor plates 12 or 14, depending on the pressure differential. The capacitor plates 12 and 14 are connected to conductor surfaces 30 and 32 formed on the outer surfaces of the glass substrates 22 and 24, by way of metallized vias formed through the holes 26 and 28. Contacts are thus available for sensing the change in capacitance due to the deflection of the ultrathin diaphragm 16. Electrical contact to the membrane 16 is made by contacting the silicon material 20. The silicon material 20 is insulated from the capacitor plates 12 and 14 by the glass substrates 22 and 24 which exhibit a very high dielectric or resistance. Conductors 34, 36 and 38 can be connected to the circuit 18 for sensing changes in the capacitance C1 and C2 and converting the same into corresponding output electrical voltages. The details of the specific construction of the transducer device 10 will be described below in terms of an exemplary device having contacts provided on only one side of the device, thereby facilitating fabrication and connection thereof to the circuit 18.

In accordance with an important feature of the invention, the transducer diaphragm 16 is fabricated as an ultrathin silicon membrane to provide increased sensitivity. With such a construction, the diaphragm 16 can be made much smaller than semiconductor diaphragms heretofore fabricated, nd made with less unit to unit variation. As a result, for a given sensitivity, the transducer diaphragm 16 can be constructed with a diameter substantially smaller than other silicon diaphragms heretofore known in the art. For example, a diaphragm 16 constructed in accordance with the invention, having a diameter of about 200 mils or less, and with a given thickness on the order of only several microns, can provide a sensitivity equivalent to a much larger diameter diaphragms constructed according to the techniques taught in the prior art.

According to a significant aspect of the invention, the silicon membrane 16 can be fabricated integral with the surrounding peripheral structure 20, and can be micromachined to independently form a desired thickness of the membrane 16 as well as form a gap or setback of a desired dimension between the diaphragm 16 and the capacitor plates 14. By achieving independent control over the capacitor gap and the diaphragm thickness, such parameters can be separately selected to optimize the linearity of transducer device 10. It should be realized that such a diaphragm thickness is about 1/10 that of paper. Also as a result of unique etching steps of the invention, the diaphragm 16 can be formed to a uniform thickness as thin as a few microns. The opposing surfaces 42 and 44 of the silicon material 20 can be micromachined to an extremely smooth or specular finish to provide an excellent electrostatic bond to the glass substrates 22 and 24.

The silicon diaphragm membrane 16 incurs substantially no hysteresis when overpressured, primarily because of the extraordinary elastic properties of silicon. The membrane 16 is not stretched or damaged when overpressured because of its close proximity to the conductive capacitor plates 12 and 14, in which event the membrane 16 contacts one or the other of the plates, and additional membrane deflection is prevented. This is accomplished by the narrow gap between the diaphragm membrane 16 and the capacitor plates 12 and 14. The near ideal elastic properties and high strength of silicon, combined with the noted overpressure protection, provide a highly reliable diaphragm operable in extreme and unpredictable environmental pressure conditions.

FIGS. 3a-3e illustrate one technique for processing a semiconductor wafer to efficiently form a large number of ultrathin membranes. As a result, a large number of transducer silicon diaphragms are fabricated simultaneously on a single silicon semiconductor wafer 20. The wafer 20 comprises suitably doped single crystal silicon and is of conventional quality and of a suitable diameter, e.g. three, four, five or six inch. While other semiconductor or other materials may be utilized in constructing transducer diaphragms according to the invention, it has been found that single crystal silicon provides excellent properties for functioning as diaphragms in capacitor displacement type of transducers. The silicon wafer 20 is preferably of the {100} crystallographic orientation. Such a wafer type is preferable as it is readily available in high quality form and is relatively inexpensive. Preferably, the entire wafer 20 should deviate from a given thickness no more than a few microns to provide highly parallel opposing surfaces. A silicon wafer 20 having a very uniform thickness provides corresponding uniform thickness diaphragms, irrespective of the location on the wafer at which the diaphragms are formed It can be appreciated that when forming very thin diaphragms of a few microns thickness, a deviation of a micron can result in diaphragms which exhibit vastly different responses to a given pressure, thus reducing wafer yield.

As shown in the exemplary processing of FIG. 3a, the silicon wafer 20 is processed in an oxidizing environment, in which a layer 48 of silicon dioxide ($SiO_2$) is thermally grown over both surfaces of the wafer 20. The wafer 20 is subjected to a silicon oxidizing ambient for a period of time sufficient to grow several thousand angstroms of a thick insulating silicon dioxide 48. As will be described in more detail below, the silicon dioxide layer 48 functions as an etch mask when etching the wafer to form the diaphragms. The deep etch required to reach the desired diaphragm thickness comprises a special class of alkaline etchants which do not degrade the silicon dioxide mask. Also, while silicon dioxide is utilized in the preferred embodiment, other etch mask materials, such as silicon nitride, can be used. Equipment for providing double-sided processing of semiconductor wafers is well known in the art, and need not be identified or further described herein.

With reference now to FIG. 3b, the processed wafer 20 is covered with a photoresist layer 50 for use in patterning the silicon dioxide 48. Preferably, a dry film photoresist 50 provides adequate definition for defining openings within the silicon dioxide 48 for forming the diaphragms in the wafer 20. For miniature transducers, the diameters of the diaphragms can be 200 mils or even smaller Other silicon features described below, such as punch-out trenches or depressions, can be formed by appropriate masking and patterning of the silicon dioxide While not shown, the photoresist film 50 is masked and exposed to ultraviolet light to develop the photoresist material to define a plurality of circular openings. Thereafter, the unmasked portion of the photoresist material is developed or removed, thereby leaving circular openings, such as 52. The diameter of the openings 52 essentially define the diameter of the transducer diaphragms of the invention.

The processed wafer 20 is then immersed in a buffered hydrofluoric (HF) acid for removing the silicon dioxide 48 which is exposed as a result of the patterning of the photoresist layer 50. HF is effective in removing the silicon dioxide 48, without substantially affecting the underlying single crystal silicon material 20. The processed wafer 20 is left in the HF solution no longer than necessary to remove the exposed material of the thin layer of silicon dioxide 48. The photoresist film 50 is then removed by conventional techniques.

FIG. 3c illustrates the structure of the processed wafer 20 after the silicon dioxide layer 48 has been patterned by the foregoing, and after subsequent etching or micromachining to define the desired setback or gap within the silicon material 20. FIG. 3d is a much enlarged portion of the processed wafer of FIG. 3d, illustrating the setback 54 resulting from the silicon material removed in the patterned silicon dioxide areas. The vertical dimension of the sidewall 54 defines a capacitor gap dimension and the desired space for accommodating the deflection of the diaphragm. The diaphragm deflection of the invention depends somewhat upon the diameter of the diaphragm, but such deflection may be only on the order of several microns Any nascent and/or residual silicon dioxide is removed in the patterned silicon openings by a potassium hydroxide etchant applied for a brief period of time. This chemical etch is effective in removing any unwanted silicon dioxide and uniformly etching down to the exposed silicon 20, without substantially destroying or otherwise affecting the thick silicon dioxide mask 48. Then, a tetramethyl ammonium hydroxide (TMAH) etchant is utilized in accordance with the preferred etchant of the invention to remove the silicon and define the setback or gap 54. Other hydroxide etches in the quaternary ammonium hydroxide family can be utilized with equal effectiveness to etch the silicon material Importantly, and in contrast with acid etches, the TMAH can be closely controlled and results in a uniform removal of the silicon material, unlike acid etches which generally result in nonuniform silicon removal at the boundaries of the silicon crystal planes. Etching silicon with acid-type etches or other alkalis often results in an orange peel surface which does not readily provide intimate contact with glass, as is required in high quality electrostatic sealing.

It is important, however, to maintain accurate control over the thickness or depth of the gap 54. The depth of the gap 54 can be carefully controlled by the timing of the TMAH etch which removes a predefined thickness of silicon for a given period of time. Hence, the processed silicon wafer 48 can be immersed in the TMAH bath at a known temperature and for a predefined period of time to attain a desired gap depth 54. In addition, the TMAH etch leaves a very smooth micromachined silicon surface, specular in nature, unlike the orange peel or irregular surfaces left by the etchants noted above. It is important to note that this finely micromachined surface, although deep etched, is electrostatically sealable to glass, in contrast with deep etched surfaces carried out with etchants such as KOH, NaOH, LiOH, RbOH, CsOH, etc. The capacitor gap dimension 54 is etched to a predefined depth to achieve a desired gap to diaphragm thickness ratio. For a given diaphragm diameter, prestrain and desired full scale pressure, there exists a diaphragm thickness and dielectric gap depth combination that provides the optimum compromise between output sensitivity and linearity.

Subsequent to the process steps leading up to the structure of FIG. 3c, the processed silicon wafer 20 is then washed in a buffered HF solution a short period of time to remove the thick silicon dioxide mask 48 on both sides of the silicon 20. Importantly, all of the silicon dioxide 48 is removed, with the exception of that which is situated around the peripheral edge of the wafer, such as shown in FIG. 3e. The annular rings 56 of silicon dioxide 48 remaining around the opposing surfaces adjacent the peripheral edge of the wafer 20 prevent a rim of silicon material from being etched so that the wafer 20 is not further thinned around the edge. This is highly important in providing rigidity to the wafer so that it can be safely handed during processing. It can be appreciated that silicon wafers which are processed and micromachined to very thin dimensions are easily broken or torn when handled. Indeed, were it not for the original thickness of the annular ring 58 surrounding the wafer 20, the handling would likely result in tearing or damaging of the delicate wafer, thereby destroying the diaphragms and rendering the wafer unusable Continuing with the silicon processing steps shown in FIG. 3e, and shortly after carrying out a residual oxide removal with KOH, the silicon wafer 20 is again subjected to a TMAH chemical etch before any nascent oxide deposits form on the surface of the virgin silicon. This is important as any silicon dioxide deposits which develop can easily mask the etching of the silicon by the TMAH solution. The second silicon etch is conducted for a period of time sufficient to thin the diaphragm surfaces 60 to achieve a desired diaphragm thickness. Uniform diaphragm thicknesses of two-three microns, and even thinner, can be achieved by the noted etching process. All other exposed surfaces of the silicon wafer, except the masked peripheral rim 56, are thinned to the same extent. Because the TMAH etch removes the exposed silicon material uniformly, the depth of the capacitor gap 54 previously formed during the first etch is substantially unaffected. Hence, the process by which the gap 54 is formed is independent of the process by which the thickness of the diaphragms are formed. A completed diaphragm is shown as reference character 16. As noted above, diaphragms of uniform thickness can be constructed throughout the entire area of the silicon wafer 20 during the second etch step. Also, as noted above, the uniformity of the thickness of each diaphragm is dependent, in a large part, on the uniformity of thickness of the original silicon wafer 20.

While the foregoing sequence of steps illustrate double sided wafer processing, those skilled in the art may find single sided processing provides certain advantages. In such event, the features and advantages of the foregoing process steps may yet be realized to achieve ultrathin diaphragms and small gaps which are fabricated independently of the diaphragm thickness, and other technical advantages.

An important feature of the invention resulting from the TMAH etch is the smooth surface 64 which surrounds each diaphragm 16. The chemical etching of the silicon wafer 20 micromachines the surfaces 64 to provide a highly smooth surface. Such a uniform and smooth surface is extremely important when the glass substrate layers 22 and 24 (FIG. 2) are electrostatically bonded to the silicon surfaces 64. After the silicon wafer 20 has been etched the second time to define the thickness of the diaphragms 16, the silicon dioxide annular rings 56 may be removed by an appropriate etch, although it is not absolutely essential that the silicon dioxide rings be removed.

The foregoing sets forth the major steps in processing the silicon wafer 20 to simultaneously form a number of uniform ultrathin diaphragms 16 having predetermined recesses or setbacks 54 and highly polished bonding surfaces 64.

An alternative method of providing a thin wafer with a annular handling rim is shown in FIG. 4b. A semiconductor wafer 57 doped with an impurity is selected so as to exhibit either p-type or n-type behavior. Then, an epitaxial layer 59 of the opposite conductivity type is grown on one wafer face so as to form a p-n junction therebetween. Preferably, with a p-type semiconductor wafer 57 and an n-type epitaxial layer 59, electroetching thereof is facilitated. The epitaxial layer thickness should be greater than or equal to the final desired silicon thickness (i.e. diaphragm thickness plus about twice the gap depth). Both surfaces of the bilayer wafer are oxidized to form a silicon dioxide layer. The bilayer wafer is then patterned and etched so that all the oxide is removed on the epitaxial surface, and all the oxide, except for an annular rim 61, is removed on the semiconductor wafer surface. The epitaxial side for the bilayer wafer is then covered with a layer of a metal passive to alkalis, such as zichronium, hafnium or titanium, such as by any conventional metal deposition process. The handling rim 61 is protected by the oxide on the semiconductor wafer surface. Then, an electroetch system is used that will stop etching at the p-n junction so as to remove all the semiconductor wafer material 57, except the epitaxial layer 59 and the rim 61, as shown in FIG. 4b. The alkali passive metal serves as an electrode during the electroetch process, in which a voltage is applied between the metal surface and the etchant. An etchant, such as TMAH, can be utilized in the electroetch process so that only the unmasked p-type semiconductor wafer material 57 is removed, without removing any of the n-type material or the metal on the epitaxial layer 59. The TMAH leaves the epitaxial surface 59 very smooth and well adapted for electrostatic sealing. The alkali metal can then be removed, thus resulting in a rimmed epitaxial wafer.

Then, after stripping all metals and oxides, the epitaxial layer 59 may again be oxidized, masked, etc. in the manner described above in connection with the non-epitaxial version so as to form the gaps and diaphragms 63. In the non-epitaxial version of FIG. 4a, the final uniformity of thickness across a wafer 20 depends upon the starting wafer thickness uniformity. Whereas, in the epitaxial version of FIG. 4b, the final uniformity depends upon the uniformity of epitaxial growth 59. Epitaxial growth thickness over a wafer face is typically extremely uniform and accomplished at reasonable cost. The foregoing process can be employed to fabricate rimmed epitaxial wafers. Epitaxial wafers of highly uniform thickness can also be formed without support rims by eliminating the rim mask step. As yet another alternative for fabricating a p-n bilayer wafer, a p-type semiconductor wafer can be used as a starting material. Thus, an n-type impurity can be diffused into one face of the semiconductor wafer to form a bilayer wafer.

As noted in FIG. 4b, the rim 61 can be formed on a single side of the epitaxial layer 59. The bottom surface of the epitaxial layer 59 is thereby flat. This construction is well adapted for assembly operations, in that the bottom glass substrate 65 can be fabricated with a diameter similar to that of the epitaxial layer 59. As will be described more thoroughly below, the glass substrate 65 can be adhered to the rimmed epitaxial layer 59 to provide additional rigidity for handling. Also, because the glass is substantially thicker than the epitaxial layer 59, by a large factor, i.e., 60 or so, there is less likelihood that the epitaxial layer 59 will incur damage when personnel place the thick glass substrate 65 against the unrimmed surface of the layer 59. Hence, in assembling the rimmed epitaxial layer 59 for electrostatic sealing, the bottom glass substrate 65 is first adhered to the layer 59, and then a smaller diameter top glass substrate (not shown) is placed within the rim 61 against the top surface of the epitaxial layer 59.

Substantially more transducers can be constructed with larger diameter wafers and thus it is imperative to provide a mechanism which reduces the probability of wafer damage due to handling. Accordingly, by providing a rigid structure around the peripheral edge of the wafer, the damage to the etched internal area thereof is much less likely, whereupon process yield is facilitated. By providing such a rigid annular structure, the processing of six inch silicon wafers is also made possible. It is to be understood that while the annular edge of the wafer can be masked to prevent removal thereof, other and different patterns may be masked to provide additional support structure to the wafer. The annular area of the silicon dioxide 48 of FIG. 4a can be masked by the noted resist film so that the underlying silicon dioxide is not removed by the HF bath which removes the silicon dioxide material radially inwardly from the annular rings 56.

In addition to mechanical support for ease of handling, the rim can be used in an alternative or supplemental methods for the control of silicon diaphragm prestrain. Because the rim's thermal mass is so much larger than that of the remaining inner thin portion of the wafer 20, there is a thermal isolation between the rim and the composite wafer sandwich during sealing. Thus, a temperature difference between the rim and the composite wafer can be established and maintained before and during the sealing process. Such a temperature difference can be used in place of or in conjunction with the mismatch in thermo-expansion between the silicon and the glass to create the desired level of prestrain during the sealing process.

Wafer heating apparatus suitable for heating the wafer rim comprises a pair of flat plates equipped with internal resistance heaters. The semiconductor wafer can be sandwiched within the heater plates so that the rim, which is thicker than the interior diaphragm area of the wafer, is heated to an extent greater than such interior part. It can be seen that with only the wafer rim making contact with the hot plates, such outer annular area is heated more than the interior part, thereby expanding to a greater extent.

An alternative method or mechanism of creating prestrain is to use a rimmed silicon wafer with a glass rim electrostatically sealed to the silicon rim. If the glass silicon thermo-expansion are chosen to give a diaphragm tension stress, this gives an independent way of setting the initial stress prior to sealing.

Having described the wafer fabrication steps for forming the ultrathin silicon diaphragms 16 (FIG. 4a), the process steps are next described below for forming the top glass substrate 22 and the bottom glass substrate 24 of the trilevel transducer structure of the invention. Glass is selected as a material for the top and bottom support structures because of its ideal bonding and insulating characteristics. First, glass is selected because of its excellent electrical insulating capabilities in the sensor operating temperature range, and that its surface provides good adherence on which conductive metals can be sputtered for forming the capacitor plates, as well as conductive pathways. In addition, glass can be micromachined to provide holes therein by several alternative processes including etching and to provide other features by etching and masking procedures. Glass materials are also available for providing an irreversible electrostatic bond and hermetic seal to silicon. Importantly, by the proper selection of a glass material's composition, a thermal coefficient of expansion can be achieved which is very close to that of silicon in a useful operating temperature range for present transducers, thereby reducing thermally induced deformation of the sensor during typical operation. This is a problem well known in the art but not overcome before the present invention by manufacturing techniques which are cost effective.

While there may be a number of glass materials well adapted for use with the invention, it has been found that a mobile oxygen containing borosilicate glass exhibits inherent properties which maximize the foregoing desirable characteristics. An example of a suitable glass is characterized by a composition shown in the following table.

TABLE

| Glass substrate composition by percent weight | |
|---|---|
| $SiO_2$ | 80.38 |
| $B_2O_3$ | 13.03 |
| $AL_2O_3$ | 2.01 |
| $Na_2O_3$ | 3.81 |
| $Sb_2O_3$ | 0.51 |
| $As_2O_3$ | 0.26 |

In addition, and as will be described in more detail below, certain highly advantageous properties of such a glass are that it exhibits a thermal coefficient of expansion lower than that single crystal silicon at an electrostatic sealing temperature, thereby imparting a tensional prestrain to the diaphragms when the sealing temperature of the trilevel structure is allowed to return to room or operating temperatures. Because the bulk of the trilevel transducer structure comprises glass, the thermal expansion of the composite structure is primarily controlled by the thermal characteristics of the glass substrates 22 and 24. As noted above, this contrasts with the prior art structures.

Therefore, and in accordance with an important feature of the invention, it is desirable to select a glass as two layers of the trilevel structure, with thermal expansion capabilities which are very closely matched with that of silicon over the desired operating temperature range of the transducers. For temperatures thereabove, such as in the range for electrostatically sealing the glass to the silicon, the glass expansion is preferably below that of silicon so that there will be a final tension created in the diaphragms during cooling to temperatures in the operating range of the device. This can be realized by selecting the transducer materials such that the silicon material shrinks more than the glass material when the trilevel structure is allowed to return from a selected sealing temperature to the operating temperature, such that the silicon diaphragms are left with the desired tension.

Such a pretensioned diaphragm is highly desirable to prevent buckling thereof which can result in a null position uncertainty (deadband) which manifests itself as an offset instability. It can be appreciated that if a thermal mismatch exists between the selected glass material and the silicon over the operating temperature range of the transducer device, the structure will be subject to changing stresses which are transmitted to the diaphragm, changing the span or output sensitivity to pressure of the transducer.

In accordance with another aspect of the invention, the various dimensions of the glass layers 22 and 24 are selected such that when fabricated as composite transducer unit with the silicon diaphragm structure 20, certain of the glass properties predominate. For example, even though silicon is stiffer than glass by a factor of about three, by utilizing glass substrates much thicker than the silicon, the glass elastic and thermal properties will dominate. In the preferred form of the invention, a total glass thickness of 40–60 mils is utilized in a composite sandwiched structure with the silicon having an exemplary thickness in the range of one mil.

Once a glass material is selected in accordance with one or more of the foregoing considerations, it is processed by way of techniques which are generally well known in the semiconductor fabrication field. Depending upon the diameter of the silicon wafer 20 utilized in forming a number of diaphragm structures, a pair of glass substrates 22 and 24 are selected having the same general diametric dimensions, except for thickness. The diameter of the glass substrates 22 and 24 is such that they fit within the support rim of the silicon wafer 20. Preferably, a mobile oxygen ion containing borosilicate glass of the noted construction is utilized, having a wafer thickness between 40 and 60 mils. As can be appreciated, the mass of such glass is substantially more than that of the silicon material which, at its widest thickness after processing, is, in the example, about 25 microns thick. Hence, the stiffness or elasticity of the glass material predominates over that of the sandwiched silicon material 20.

Before describing the details of the fabrication and assembly of the miniature transducer of the invention, reference is first made to FIGS. 5–7 where a completed structure is shown. FIG. 5 illustrates a much enlarged trilevel transducer formed from a die 72 of an array of other similar structures. In practice, the miniature transducers 72 are constructed with a square glass-semiconductor-glass trilevel structure of about 300 mils by 300 mils. A top glass substrate 22 is electrostatically bonded to a silicon diaphragm structure 20, as is a bottom glass substrate 24. The ultrathin diaphragm 16 is thereby hermetically sealed and pretensioned with respect to the top and bottom glass substrates 22 and 24. As noted above, the silicon structure 20 is etched a first time to provide a gap 54, and a second time to define the thickness of the diaphragm 16 as well as a finely micromachined upper and lower silicon body surfaces, such as 64. This facilitates a high quality electrostatic seal between the glass substrates 22 and 24 and the semiconductor structure 20 sandwiched therebetween.

The top and bottom glass substrates 22 and 24 each have a small hole 26 and 28 formed therein for allowing external ambient fluid pressure be transmitted to the ultrathin silicon diaphragm 16. The holes 26 and 28 are formed in the respective glass substrates at a diameter of about 20–25 mils. Such holes have been formed in the glass substrates by pressure abrasive, water jet or chemical milling techniques. The diameter by which such holes 26 and 28 are formed is related to the thickness of the glass substrates, such that subsequent processing can be utilized to form a conductive metal coating through the holes.

Figure 9:
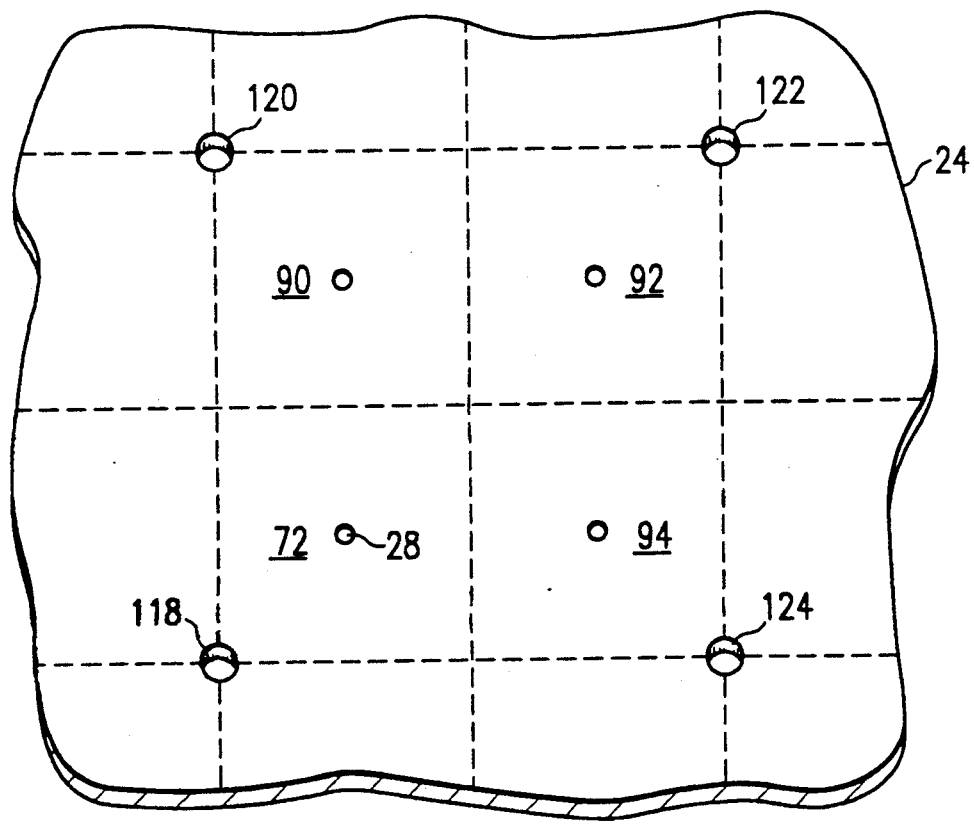

An array of transducer die 72 are simultaneously fabricated with glass substrates and semiconductor wafer materials. Indeed, a quadrature unit cell, comprising four corresponding transducer die 72 is repeated as an array of unit cells over the surfaces of the glass and silicon material. Shown in FIG. 8 is a quadrature cell structure with holes formed in the top glass substrate 22. Particularly, the top glass substrate 22 of transducer die 72 is formed in the lower left corner of the quadrature unit cells, with the other three similarly constructed transducer die 90–94 formed in the other three quadrants of the cell. FIG. 9 illustrates a bottom glass substrate 24 having a quadrature unit cell with the transducer die 72 again located in a lower left corner thereof. Other corresponding and similarly constructed transducer die 90–94 are formed in the other three neighboring quadrants of the bottom glass substrate 24. Identical quadrature cell structures are formed in identical manners as an array on both the top and bottom glass substrates 22 and 24. As a result, when processing 4-inch glass structures, approximately 97 transducer die can be fabricated as compared with about 57 such structures when employing 3-inch diameter glass and silicon semiconductor wafers. Higher yields can be obtained by processing 6-inch silicon wafers, preferably with the noted support rim.

Returning to FIGS. 5–7, the holes 26 and 28 are formed in the corresponding glass substrates 22 and 24 by the noted water jet, abrasive or etching techniques. Preferably, abrasive boring techniques are utilized to efficiently and quickly form a small uniform hole 20–25 mils diameter, without crazing or chipping the glass substrate. In addition, the abrasive technique produces a non-vertical hole that facilitates subsequent metal step coverage. In order to fabricate a transducer die 72 having contacts available from one side thereof, the top glass substrate 22 includes opposing circular cutouts at corners 104 and 106 for exposing corresponding contacts 108 and 110 formed at the corners of the silicon semiconductor material wafer 20. As noted in FIG. 8, the holes in the opposing corners of the die of the top glass substrate 22 are formed with an adequate diameter for accessing electrical contacts on the silicon wafer 20. As can be appreciated, the formation of a single hole in the top glass substrate 22 provides curved quarter corners for a corresponding four die formed simultaneously in the top glass substrate 22. Similar sized holes 112 and 114 provide curved cutouts for die 90, 92 and 94, and other partially shown die of the quadrature unit cell shown in FIG. 8. The top glass substrate 22 further includes a larger circular cutout 116 which provides access to a contact 162 on the bottom glass substrate 24. The cutout 116 is formed as a 150 mil diameter hole in the top glass substrate 22, which serves as large quarter cutouts for other neighboring die of other quadrature unit cells.

In completing the fabrication of holes in the glass substrate 22 and 24, a smaller circular cutout 118 is formed in the bottom glass substrate 24 which serves as a mechanism for allowing the sputtering of a conductive metal therethrough to provide a conductor from the upper side of the bottom glass substrate 24 to the under side thereof. As noted in FIG. 9, a small diameter hole is formed at the corner of four die so that when plated through, a conductive via is simultaneously provided to four neighboring die. Corresponding holes 120-124 are formed at the corners of the die locations 90-94 of the quadrature unit cell shown in FIG. 9.

Next, the top glass substrate 22 and the bottom glass substrate 24 are prepared for metal deposition to provide the capacitor plates as well as interconnecting conductive paths. In addition, and to be described in more detail below, various other paths are provided for use in achieving a high quality electrostatic seal, as well as pretension of the silicon diaphragms. In forming the metallized paths, a conductive metal, such as aluminum or chromium-gold, or other suitable material, is sputtered over both upper and under surfaces and sides of the glass substrates 22 and 24. It can be appreciated that the inside surfaces of each of the holes is thereby covered with a conductive material. The conductive metal is sputtered to a thickness of several thousand angstroms, or other suitable depth, to achieve a low resistance electrical path, and yet maintain good step coverage. After forming a conductive coating on the surfaces and edges of the glass substrates 22 and 24, each side is covered with a dry film photoresist. Such a photoresist is advantageous in the patterning of the glass wafers, as such resist bridges over the metallized holes so that a subsequent etching step does not remove the metal at the conductive via locations.

Figure 10:
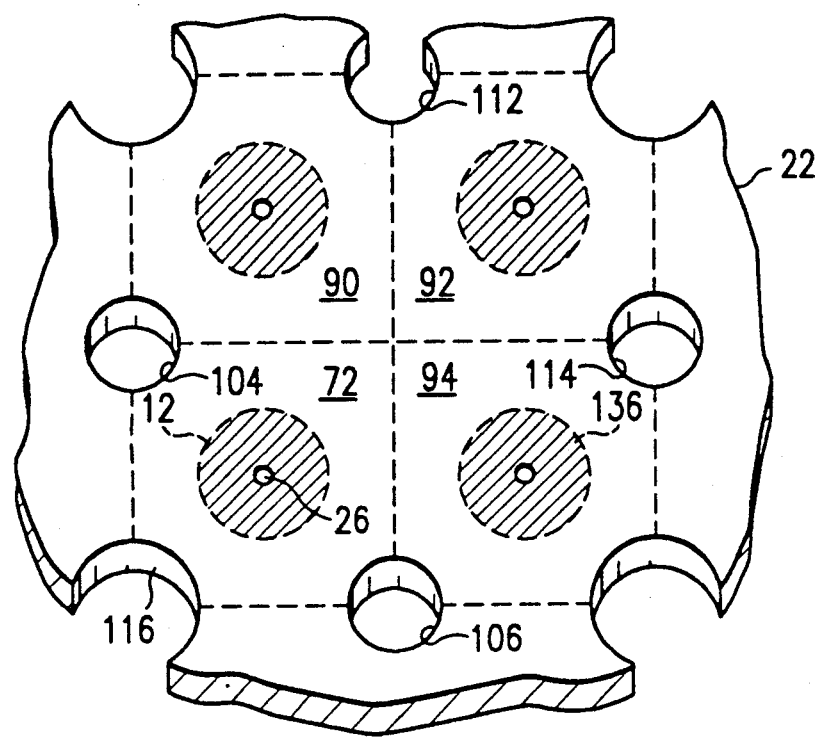
FIGS. 10 and 11 are top views illustrating the metal patterns on the under and upper surfaces of the top glass substrate.

FIG. 10 illustrates the top glass substrate 22 with a conductive capacitor plate 12 formed centrally in die 72 of the unit cell. FIG. 10 is a view of the top glass substrate 22, as viewed from above. For reasons of clarity, the metallized pattern on the upper surface of the top glass substrate 22 is not shown in FIG. 10. Significantly, the capacitor plate 12 is formed in electrical continuity with the conductive material in the central hole 26. Die 90-94 of the quadrature cell have corresponding conductive capacitor plates 132-136 formed in association therewith. Also, FIG. 10 illustrates the patterned metallized areas after appropriate photolithographic processing has been carried out on the dry film resist and subsequent etching of the sputtered metal.

Figure 11:
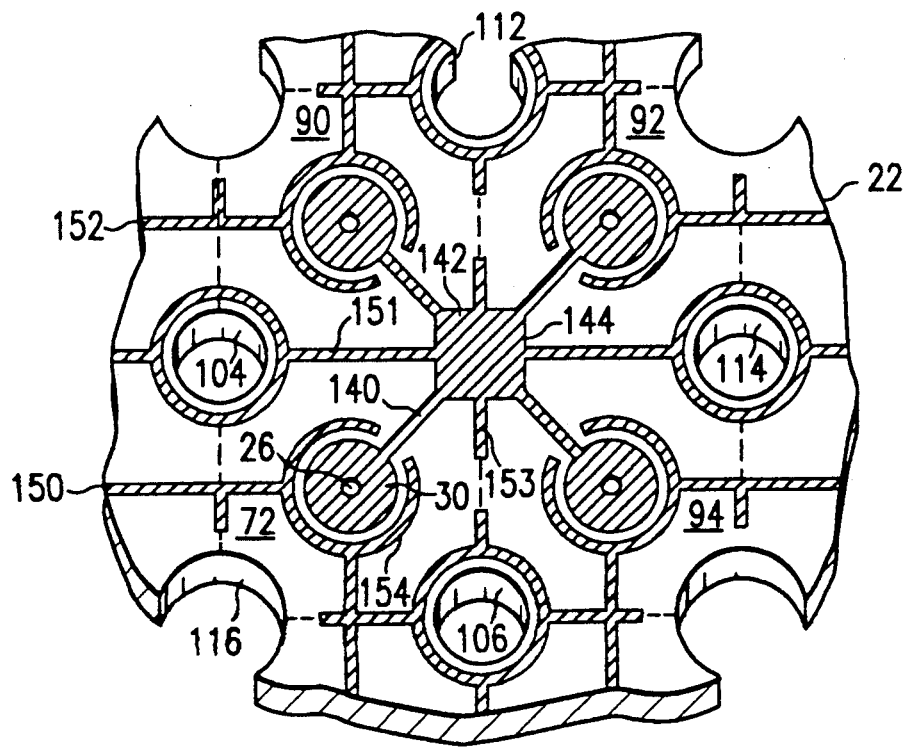

FIG. 11 illustrates the metallized pattern on the upper surface of the top glass substrate 22, subsequent to patterning thereof with a dry film resist to achieve the noted pattern. It should be understood that the masking, patterning and etching of the metal on both surfaces of the top glass substrate 22 can be carried out at the same time and with the same steps, i.e., as simultaneous double-sided operations. Transducer die 72 includes a top land area 30 connected by a conductive path 140 to a die corner contact 142. As can be appreciated, a large square central cell contact pad 144 serves as four corner contacts for the corresponding die of the quadrature unit cell. With such a construction, the corner contact 142 is connected by way of the conductive via 26 to the capacitor plate 12 formed on the underside of the top glass substrate 22.

Also noted in FIG. 11 are additional conductive paths such as 150 and 152 which provide an important function during the electrostatic sealing of the top glass substrate 22 to the silicon wafer 20, and the bottom glass substrate 24 to form a composite unitary transducer structure. Other conductive paths such as 151 and 153 form conductive boundaries utilized during sealing to maintain the silicon and capacitor plates at the same potential. While not shown, the conductive paths 150 and 152 are connected together and extended to the peripheral edge of the top glass substrate 22 for connection to a source of high voltage utilized in achieving the electrostatic seal. The C-shaped conductive paths, such as 154, substantially encircle a capacitor plate and underlying silicon diaphragm area to facilitate the noted electrostatic seal, as well as the pretensioning of the ultrathin silicon diaphragm 16. Such a sealing process will be described in more detail below.

Figure 12:
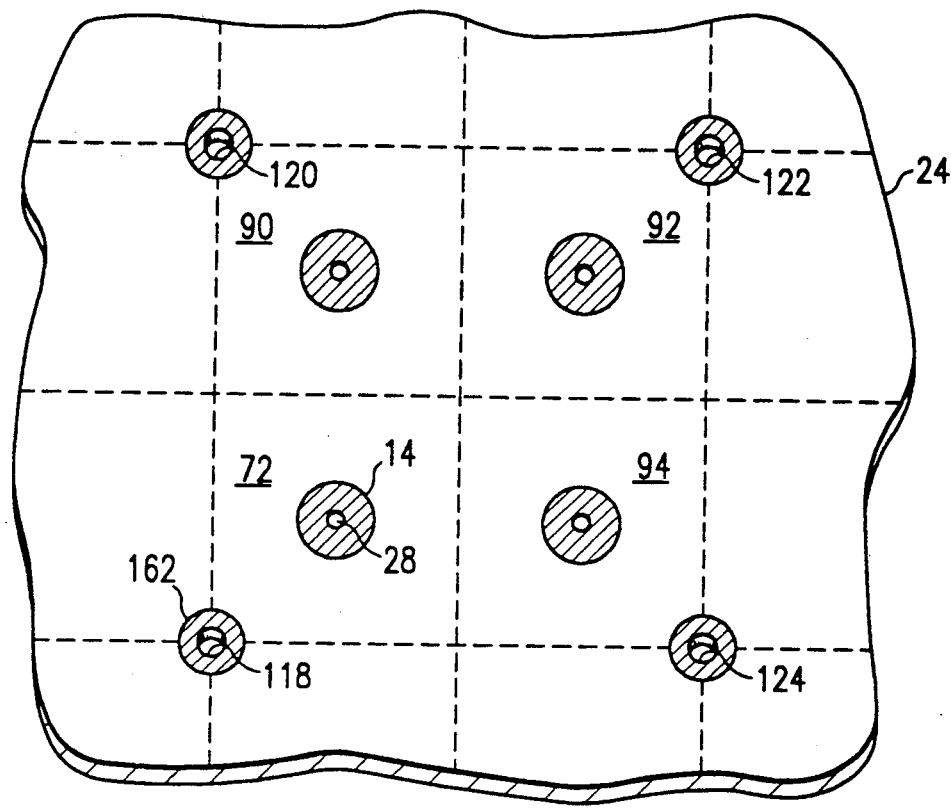
FIGS. 12 and 13 are top views illustrating the metal patterns on the upper and under surfaces of the bottom glass substrate.

FIG. 12 depicts the patterning on the upper surface of the bottom glass substrate 24 for forming the capacitor plates, as well as other conductive land areas. The circular shaped conductive area 14 defines the capacitor plate associated with die 72. The capacitor plate 14 is electrically connected to the conductive material coating the small via 28. Also associated with die 72 is a conductive corner land area 162, a quarter of which will form a top side contact for the capacitor plate 14 of the trilevel transducer die 72. A conductive path (not shown in FIG. 12) formed on the under side of the bottom glass substrate 24 provides the interconnection between the capacitor plate 14 and the contact surface 162.

Figure 13:
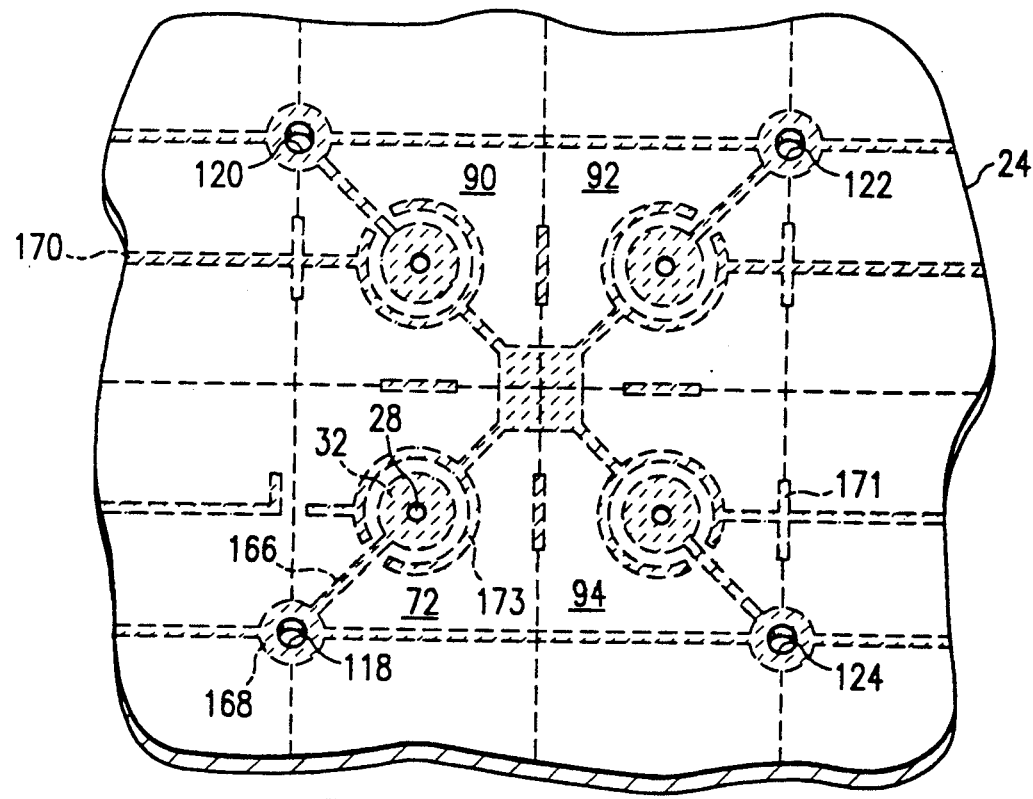

FIG. 13 illustrates the metalized pattern on the under surface of the bottom glass substrate 24, with the metallized pattern on the upper surface thereof not shown for clarity. The view is shown as viewed from the top of the bottom glass substrate 24. Again, a quadrature unit cell of die 72, 90-94 are shown as part of an array of other similar cells formed on the bottom glass substrate 24. Focusing on die location 72 of the cell, there is shown a circular metallized land area 32 which is connected to the capacitor plate 14 (FIG. 12) by way of the conductive via 28. The metallized land area 32 is connected by a conductor path 166 to a metallized die corner land area 168 which is electrically connected to the contact land area 162 (FIG. 12) by way of the conductive via 118. In this manner, a contact is provided on the top surface of the bottom glass substrate 24, without forming conductive paths on the upper surface which would otherwise provide a short circuit to the silicon wafer 20. Similar contact structures are provided with the other die formed within the quadrature unit cell. As can be appreciated, when the composite trilevel transducer structure is cut or sawed along the broken lines bordering each die of the quadrature cells, the contact structure 168 is quartered, thereby providing the only conductive connection between the upper and under surfaces of the bottom glass substrate 24. The contact is shown in FIG. 5 as a top side contact 162 for the transducer 72.

A grid of other connecting conductive paths 170 and 171 is also shown in FIG. 13 for achieving an electrostatic seal around the diaphragm areas of the silicon semiconductor wafer 20 to the glass substrates. The sealing grids 170 and 171 are connected together and connected to each C-shaped ring 173 formed on the bottom glass substrate 24. Each C-shaped ring 173 at least partially encircles a silicon wafer diaphragm 16. When the top and bottom glass substrates 22 and 24 are registered or aligned with the silicon wafer 20 sandwiched therebetween, the top C-shaped ring 154 (FIG. 11) and the bottom C-shaped ring 173 encircle the diaphragm 16 of die 72. All other wafer diaphragms are similarly encircled with corresponding top and bottom glass substrate C-shaped sealing rings. This is essential to the electrostatic sealing and diaphragm tensioning, the details of which are described below. It can be seen that each C-shaped ring 154 and 173 has a break therein for allowing conductor access to metallized land areas 30 and 32. However, the break in the respective top and bottom C-shaped rings are not vertically aligned, but rather are offset, in the preferred embodiment about 180°, to accommodate other conductor paths on the respective substrates. The conductors 170 and 171 of the grid are extended to the edge of the bottom glass substrate 24 to a contact pad, not shown. Such a grid structure concentrates the electrostatic lines of force from each of the glass substrates 22 and 24 to the intermediate silicon wafer. The lines of force between each of the upper and lower C-rings and semiconductor wafer surfaces form respective vertical cylinders bounding the associated silicon diaphragms, thereby sealing the sandwiched wafer together as a composite unit. The lines of force in the region of the gap of the ring should not be perpendicular, or there would be no seal. The lines of force must spread laterally to create the electrical conditions for a complete circumferential hermetic seal. The C-ring sealing conductors of the invention provide for a lateral spreading of the electrical lines of force, thereby achieving a continuous circular seal As a result of the electrostatic bonding, otherwise known as anodic bonding, a seal is provided completely around each diaphragm area of the semiconductor wafer 20. Also, the sealing grid provides a boundary around each die and is believed to provide a relief zone for a material compression region which results in additional diaphragm tensioning.

Figure 14:
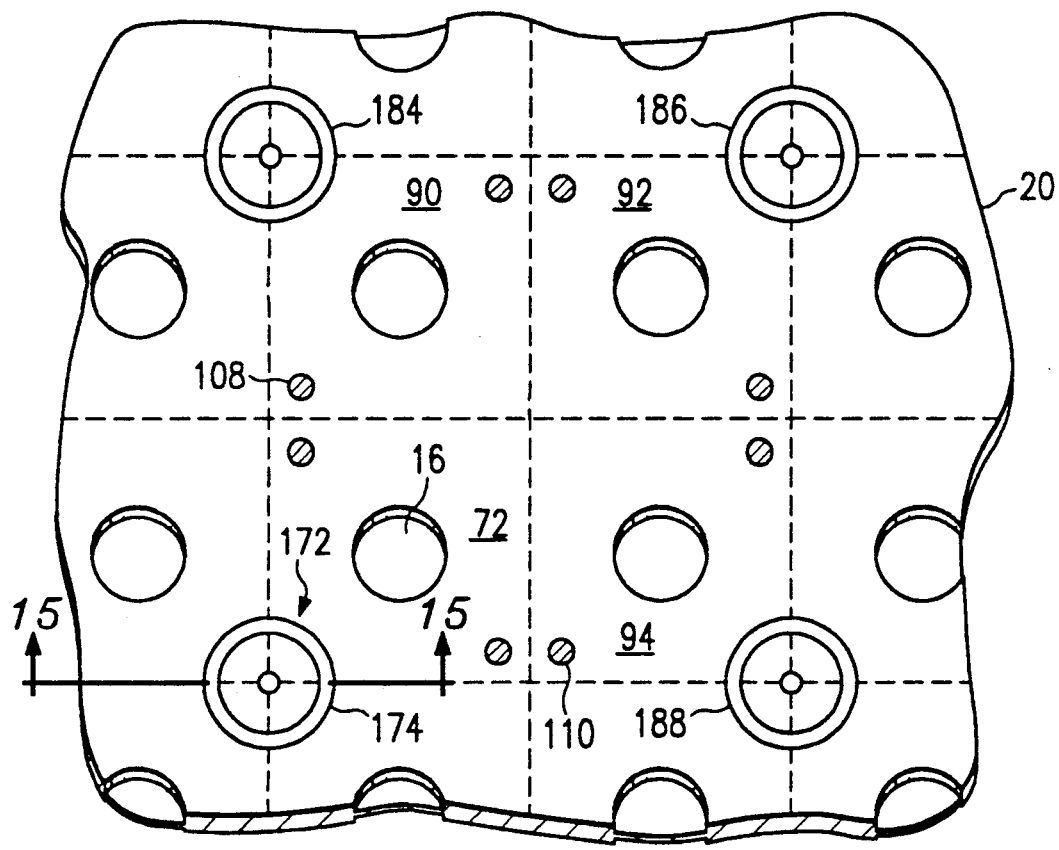
FIG. 14 is a top view illustrating the detailed construction of a portion of the silicon wafer defining ultrathin diaphragms in a quadrature unit cell.

With reference now to FIG. 14, a quadrature unit cell portion of the semiconductor wafer 20 is shown. Specifically shown is diaphragm 16 associated with die 72, together with the other diaphragms associated with the other die of the quadrature unit cell. Associated with the die 72 is a circular frangible area 172 which can be removed or punched out to thereby form a circular recess or quarter hole at a corner of the die 72. The frangible area 172 comprises a trench 174 formed in the surface of the silicon wafer 20 such that the circular area 172 can be removed.

Figure 15:
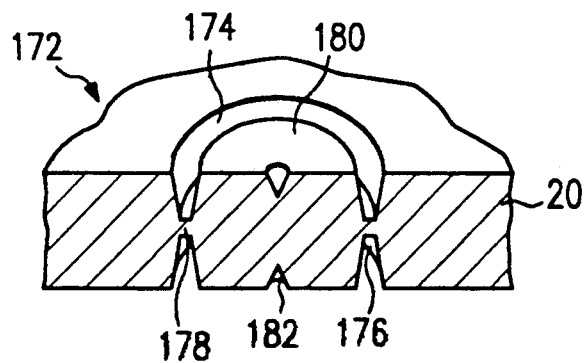
FIG. 15 is a cross-sectional view of a portion of the silicon wafer of FIG. 14, showing a trenched circular area for providing a punch out section to form a hole in the wafer.

FIG. 15 is a much enlarged cross-sectional view of the frangible area 172. Trenches 174 and 176 are formed into both surfaces of the silicon wafer 20, leaving an annular frangible area 178 which can be easily broken by pushing on a central area 180. An indentation 182 can be formed in the central area 180 for centering a probe or pointed device in such area 180, and applying a force to break the frangible annular silicon area 178. The trenches 174 and 176 can be formed in substantially the same masking and etching steps as the diaphragm membranes 16. Alternatively, the trenches 174 and 176 can be formed separately, using other semiconductor etching or trench techniques. The punch out structures 184-188 (FIG. 14) associated with the other die locations 90-94 are similarly constructed. Shown in FIG. 14 also are metallized contacts 108 and 110 for providing electrical connections to the transducer die 72. While only a single contact is necessary to each die, a pair of such contacts is easily made due to the quadrature nature of the unit cells. One reason for the redundancy (i.e. two silicon contacts per sensor where only one is needed) is that quadrature is needed for optimum hole sharing. Since only three contacts are required, there will be one extra contact. However, the choice of silicon contact redundancy is no arbitrary. The thermoresistance of the silicon and the two silicon contacts provide a useful resistive temperature sensor. Preferably, and as an alternative, the silicon can be implanted or diffused with an impurity in one of the contact regions of each sensor such that the two contacts form a p-n diode temperature sensor. Voltage-temperature characteristics of p-n diodes are well known, and thus by measuring the voltage across the diode, the temperature of the transducer can be determined. The metallized areas 108 and 110 can be formed by conventional metallization and patterning steps well known in the semiconductor processing art. Similar pairs of contact areas are provided at the diagonal corners of the other transducer die locations 90-94.

The foregoing describes the major steps in fabricating the top glass substrate 22, the silicon semiconductor wafer 20, and the bottom glass substrate 24. The silicon wafer and glass substrates are then placed together with all similar quadrature unit cells registered. In other words, the layers are sandwiched together so that the top capacitor plates 12 on the under surfaces of the top glass substrate 22 are aligned with the corresponding ultrathin diaphragm membranes 16 formed in the silicon semiconductor wafer 20. The bottom capacitor plates 14 formed on the upper surface of the bottom glass substrate 24 are aligned in like manner with the diaphragm membranes 16. By providing index marks in predefined places on the glass substrates 22 and 24 and on the semiconductor wafer 20, the layers can be registered by visually aligning the layers together and then pressing or clamping the composite structure together when aligned.

The trilevel structure is registered, assembled and sealed in two separate operations as described below. First, the silicon wafer 20 is placed on a clean flat surface (e.g. fused silica or silicon wafer). The flat surface contains very small vacuum ports to supply a small holding or suction force on the silicon-glass composite wafer 20, or if the wafer 20 and the flat surface are clean enough, the wafer 20 will adhere to the flat surface with enough force to keep the wafer 20 in a fixed position as the subsequent glass substrate aligning step is carried out.

A very small drop of temporary adhesive is placed in a depression (not shown) on the silicon wafer 20. This will provide adherence to the glass substrate. One glass substrate is then placed on the silicon wafer 20 and aligned to the silicon diaphragm edges on the facing side. The adhesive droplet preferably contacts the glass substrate at a place where it is open to view. The adhesive is then allowed to harden by use of ultraviolet light. An adhesive suitable for such use comprises an ultraviolet curing glass adhesive, commercially available from Loctite Corp., under the trademark Crystal Clear. The bilevel composite can now be handled whereupon it is turned over and the above alignment process repeated with the second glass substrate. The resulting adhesively joined/aligned trilevel is then ready for electrostatic sealing. It should be noted that the minuscule adhesive droplets when properly positioned do not interfere with the subsequent heating and electrostatic sealing step. The adhesive droplet is positioned near the perimeter of the silicon wafer composite so as not to inhibit the sealing by thermal decomposition products.

The sealing is accomplished in the following manner. The adhesively bonded trilevel structure is placed on an electrically insulated and uniformly heated flat plate. Electrical connections are then made to the grids of the two glass substrates 22 and 24 and the silicon wafer 20 as follows. The silicon wafer 20 is attached to the (+) electrical lead of a DC power supply. Two independent electrical contacts are made to the sealing grids of each glass substrate 22 and 24. The capacitor plate contacts at the edge of each glass substrate 22 and 24 are connected to the negative (−) electrical power supply terminal. The geometrical form of these electrical paths and vias are shown in FIGS. 11 and 13.

The actual bonding is carried out by heating the wafer-substrate structure and applying a high voltage, of a few hundred volts, between the sealing grid 150, 52 and 170, 171 of the glass substrates 22 and 24, with the silicon wafer 20 sandwiched therebetween. The trilevel wafer structure is maintained, aligned and heated in a furnace to a sealing temperature of about 300–400° C., before the application of the sealing voltage. The application of such voltage for a short period of time is adequate to achieve a high quality seal. Anodic or electrostatic bonding between glass and silicon is described in U.S. Pat. Nos. 4,384,899, 4,121,334 and 3,397,278.

In order to impart a pretension to each of the ultrathin diaphragms formed in the silicon wafer 20, the coefficients of thermal expansion of the various materials are preferably selected to exhibit the relationships shown in FIG. 16. The horizontal axis of such graph indicates the sealing temperature in ° C., while the vertical axis indicates thermal expansion in parts per million. Line 196 illustrates the expansive and contractive nature of silicon at the various temperatures noted. In like manner, line 198 represents the expansive and contractive characteristics of the top and bottom glass substrate structures 22 and 24 which are electrostatically sealed to the silicon 20. In practice, it has been found that a borosilicate glass having the composition noted above has a thermal coefficient of linear expansion characteristic very similar to that of graphical line 198. As can be seen, in an operating temperature range centered around about 100° C., the coefficients of expansion of the silicon and the glass are essentially the same. In contrast, in a temperature range about 300–400° C., which is the temperature suitable for electrostatically sealing the glass to the silicon, the thermal coefficients of expansion are different. Importantly, the thermal coefficient of expansion of the glass is less than that of the silicon in the sealing temperature range. Therefore, during the electrostatic sealing process when the temperature of the composite material layers is increased and allowed to return to room temperature, the silicon contracts to a greater extent than the glass to which the diaphragm is peripherally bonded and anchored, thereby leaving the silicon diaphragm material prestressed. It should be understood that before the actual electrostatic bonding occurs, the silicon and glass layers are not anchored together and are free to expand according to the respective thermal coefficients of expansion. Importantly, the sealing potential is applied uniformly around the silicon diaphragm 16 by the C-shaped conductive rings 154 on the top glass substrate 22 and the C-shaped conductive ring 173 on the bottom glass substrate 24. As noted, during the increase in temperature during the sealing process, the silicon expands to a greater extent than the glass, but at such temperature the sealing voltage is applied and the silicon then becomes bonded to the glass, thereby fixing the layers together. During the subsequent decrease in temperature, the silicon attempts to contract to a greater extent than that of glass, whereby the glass substrates which are in control impart a tensile prestrain to the silicon. The particular degree by which the diaphragms 16 are tensioned can be achieved by choosing a sealing temperature associated with a specified difference in the thermal coefficient of expansion of the glass and silicon materials. The sealing temperatures which yield various tensions can be experimentally determined. The specific tensioning of the diaphragms can facilitate the linearization of the operation of the transducer.

Although FIG. 16 illustrates the thermal characteristics of materials which are considered preferred to create diaphragm tension, other materials and corresponding techniques are possible. For example, materials can be selected in which the thermal coefficients of expansion are not substantially different at the fabrication or electrostatic sealing temperature, but which are different at a temperature through which the process traverses in reaching an operating temperature. Hence, after the diaphragm and support layers are fixed and the composite structure is allowed to return to an operating temperature range, the diaphragm material undergoes more thermal contraction as does the support material, whereby the diaphragm remains in a tensioned state.

The phenomenon by which the sealing of the glass to the semiconductor wafer 20 can be more easily understood by referring to FIG. 17. As noted above, the same potential, designated V+, is applied to the upper capacitor plate 12, the lower capacitor plate 14, and the silicon semiconductor wafer 20. The equipotential voltage between the capacitor plates and the ultrathin diaphragm 16 prevents the electrostatic forces from pulling the diaphragm 16 toward one or the other of the upper and lower capacitor plates during the electrostatic sealing process. In order for the glass substrates 22 and 24 to be sealed to the silicon wafer 20, the glass substrates must be maintained several hundred volts negative with respect to the silicon wafer 20. The sealing voltage is shown as V− which is applied to the C-shaped conductive rings 154 on the top glass substrate 20, as well as the C-shaped conductive paths 173 formed on the under surface of the bottom glass substrate 24.

During the sealing process, it is believed that an additional mechanism comes into play for prestressing the silicon diaphragm 16. During the electrostatic sealing process, in which the top C-shaped ring 154 and the silicon wafer 20 are maintained at a potential of about 300–400 volts, a depletion region 210 is formed in a narrow interface region in the glass substrate 22 near the surface of the silicon wafer 20. The depletion region 210 is formed by the potential difference across the glass which creates low atomic number alkali ions, e.g. (Li+Na+) and negative oxygen ions (O−). The alkali ions are atomically lighter in weight and faster moving than the corresponding oxygen ions, whereby the positively charged alkali ions migrate more quickly toward the C-shaped ring 154 which has a negative potential applied thereto. The negatively charged oxygen ions move at a slower rate toward the glass-silicon interface. However, the net movement of ions with regard to the glass-silicon interface comprises a migration of the positively charged alkali ions toward the C-shaped ring 154 and the motion of negatively charged oxygen ions toward the glass silicon interface. Accordingly, the depletion region 210 is thereby formed which gives rise to an electrostatic seal between the top glass substrate 22 and the silicon wafer 20. In actuality, it is believed that a seal region of only about 2–3 atoms thick creates a bridging oxygen-silicon layer. The silicon atoms do not appreciably move into the glass material. The oxygen ions, however, move from the glass to the silicon/- glass interface and form the bridging oxygen layer which irreversibly bonds the glass to the silicon. The same action occurs between the silicon wafer 20 and the bottom glass substrate 24 when a negative voltage is applied to the C-shaped ring 173 formed on the under surface of the glass substrate 24. The electrostatic seal formed as a result of the depletion region 210 is also a hermetic type seal.

The net movement of ions away from the depletion region 210 comprises a decrease in volume at the depletion region which causes a stress or stretch in the diaphragm 16, it being realized that the alkali ions and oxygen ions are migrating from the depletion region. The accumulation of the alkali ions in the glass substrates 22 and 24 between the C-shaped rings 154 and 173 comprise an area of molecular compression. The regions of stress and compression are shown in FIG. 17.

During the electrostatic sealing operation at elevated temperature, all the capacitor plates 12 and 14 on the top and bottom glass substrates are maintained at the same potential at all times during application of voltage, as is the silicon wafer 20, to prevent electrostatic forces from acting upon the diaphragms. Grid metal runs 151 referenced in FIG. 11 and similar runs 170 shown in FIG. 13 short circuit all the capacitors to a large pad at the perimeter of each glass substrate outer surface. The pads are directly opposite each other such that an alligator clip type of contact can provide the common potential. Similarly, the Cshaped rings 154 referenced in FIG. 11 and sealing grid metal runs 150 and 152 and similar rings and runs 171 shown in FIG. 13 short to another pair of opposing pads at the perimeter of each glass outer surface. Contact to the silicon wafer 20 is made at any sensor location, such as 72, 90-94, via an appropriate hole in the top glass substrate 22. Then, the contact to the capacitor pads and the contact to the silicon are shorted together. A second contact is made to the sealing ring pads.

After the sealing operation is completed, the resulting trilevel composite is aligned with a separate glass substrate that has been patterned with holes slightly larger and in the same position as holes 104, 106, 112, and 114 of FIG. 8. The resultant glass substrate forms a stencil for subsequent metallization and allows selective coating of the silicon contacts. A stencil approach is preferable due to the high probability of contaminating the silicon diaphragm. Conventional blanket coating of the trilevel structure and selective removal with photolithographic techniques would result in residue in the cavity formed between the diaphragm and the glass. Removal of any photoresist residue is almost impossible in that access to that cavity, typically less than one mil thick and 200 mils diameter, is exclusively through a 20-25 mil diameter hole.

Figure 18:
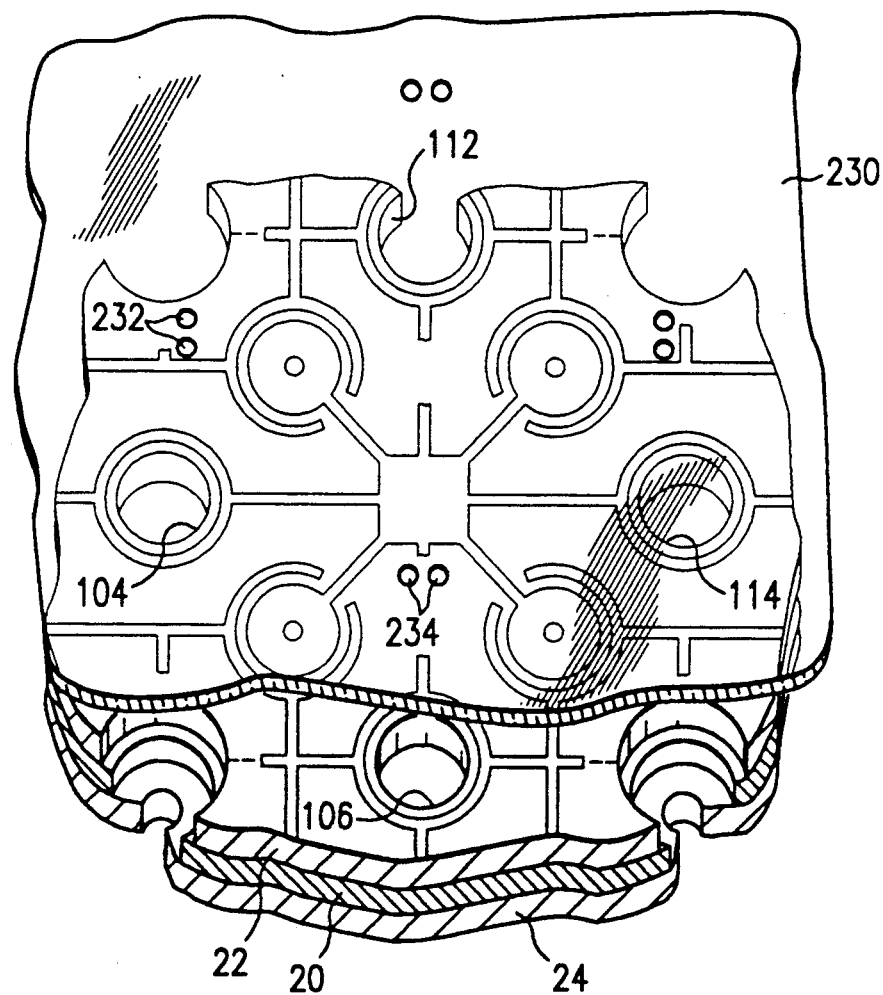
FIG. 18 is an isometric view of a portion of the composite trilevel transducer structure, with an overlying apertured stencil plate for forming electrical contacts on the intermediate semiconductor wafer.

The sealed trilevel composite and a properly aligned apertured glass stencil is then placed in an appropriate fixture and coated with a conductive material by evaporation or sputtering technique, to a thickness of about 10,000 angstroms. A stencil plate 230 is shown in FIG. 18 removed from an electrosealed trilevel transducer structure. The stencil plate 230 is essentially a thin glass plate which has a pattern of apertures 232 and 234 which are spaced apart at locations coincident with the silicon wafer contact areas, such as shown by numerals 108 and 110 in FIG. 14. The stencil plate 230 is aligned on the top of the top glass substrate 20 such that the stencil plate hole pairs 232 and 234 are registered with the large holes 104 and 106 in the top glass substrate 22, as well as the desired silicon contact areas 108 and 110. The stencil plate apertures 232 and 234 are of a diameter such that when aluminum is sputtered over the surface of the stencil plate 230, the silicon wafer areas 108 and 110 are metallized with the conductive metal. The other contact pairs of the other die of the silicon wafer 20 are formed simultaneously. As can be realized, the sputtering of the metal contacts on the silicon wafer top surface is carried out through the holes 104 and 106 of the top glass substrate 22. In order to form a metal contact on adjacent corners of neighboring die, the stencil plate 230 has two closely spaced apertures aligned with respect to each top glass substrate hole, 104, 106 and 112, 114. Subsequent to the metallizing process, the stencil 270 is removed and the trilevel structure is sintered at about 350° C. for a sufficient time to ensure adequate ohmic contact of metal to silicon wafer 20. The trilevel structure is then prepared for sawing into individual die.

An extremely small, highly sensitive pressure responsive transducer can be fabricated according to the foregoing steps. Indeed, transducers responsive to small pressure changes in the neighborhood of 0.0001 inch of water can be detected. The corresponding diaphragm deflection resulting from such a small pressure change may be about ten angstroms, or about three atomic diameters. Depending on the gap and diaphragm thickness, full scale capacitance may range from about 8 picofarad to 40 picofarad, with a resolution of about 40-100 femtofarads. In detecting pressure changes of about three inches of water, a transducer of the invention having a gap of tens of microns can experience a full scale diaphragm deflection of several microns, thereby producing about 8 picofarads full scale span.

While the foregoing wafer fabrication is described in terms of employing sealing grid conductors formed on the top and bottom glass substrates 22 and 24, the same effect can be achieved by eliminating such glass conductor grids, and utilizing a waffle iron-like fixture having a top and bottom rigid metal matrix which hinges and closes in on and compresses the top and bottom glass substrates together to sandwich the silicon wafer 20 therebetween. Formed on the inner surfaces of the rigid metal matrix are the C-shaped sealing ridges and the associated die boundary conductor paths. With this construction, the sealing voltage can be applied to the metal matrix, thereby inducing the electrostatic force in the glass substrate and silicon wafers and achieving the electrostatic seal.

From the foregoing, disclosed is a miniature capacitive displacement transducer structure and method of fabrication thereof. A technical advantage presented by the transducer is that by processing the diaphragm to a very thin membrane, the physical size of the transducer can be maintained small, while yet achieving a high sensitivity. Another technical advantage of the invention is that in processing the semiconductor wafer to form the diaphragms, a double-sided first etch and a double-sided second etch is carried out to form the capacitor gap independently of the thickness of the diaphragm. An associated technical advantage is that by maintaining independent control over the capacitor gap and the diaphragm thickness, certain combinations thereof can be achieved to maintain a linear output of the capacitance for linear changes in the input pressure. Yet another technical advantage of the invention is that by fabricating the various layers in a quadrature unit cell fashion, the number of transducer structures available from a given size wafer is maximized. In addition, a technical advantage presented by the invention is that by employing double-sided processing of various substrates to obtain conductors, and by fabricating access holes in various upper layers of the composite structure, top side access can be obtained to 11 electrical contacts of the transducer. An additional technical advantage of the invention is that by properly selecting the glass and silicon materials, automatic prestressing is obtained during the electrostatic bonding process. An associated technical advantage is that by providing appropriate sealing grids over the surface of the glass structures, the compression regions arising from the volumetric changes in the glass material can be maintained in the various die locations, without effecting the diaphragm tension in neighboring die locations.

While the preferred embodiment of the invention has been disclosed with reference to a specific transducer structure, and method of fabrication thereof, it is to be understood that many changes in detail may be made as a matter of engineering choices without departing from the spirit and scope of the invention, as defined by the appended claims.

What is claimed is:

1. A method for fabricating semiconductor diaphragms adapted for use in transducer apparatus, comprising the steps of:
   patterning a semiconductor wafer with an etch mask having openings defining diaphragm areas for said wafer;
   etching the patterned semiconductor wafer to a predefined depth to define a setback gap;
   removing the etch mask to provide an unmasked semiconductor surface; and
   etching said semiconductor surface with a quaternary ammonium hydroxide to form a desired diaphragm thickness and to provide specular surfaces adapted for electrostatic sealing.

2. The method of claim 1, further including etching said semiconductor material with tetramethyl ammonium hydroxide.

3. The method of claim 1, further including processing single crystal silicon as said semiconductor material.

4. The method of claim 1, further including masking said semiconductor material with a silicon dioxide.

5. The method of claim 4, further including patterning said silicon dioxide with a photoresist.

6. The method of claim 1, further including etching said semiconductor material about 5–20 microns to define said setback gap.

7. The method of claim 1, further including patterning and etching said semiconductor to provide micromachined planar surfaces around each said diaphragm.

8. The method of claim 7, further including etching the semiconductor material a second time to define a diaphragm thickness of about 3–20 microns.

9. The method of claim 1, further including starting with a silicon semiconductor wafer of about 100 microns thick or less.

10. The method of claim 1, further including patterning and etching opposing sides of the semiconductor wafer to provide cross-sectionally symmetrical diaphragm structures.

11. The method of claim 1, further including patterning an area on the semiconductor material to prevent etching thereof and thereby provide rigidity so that the wafer can be handled.

12. The method of claim 11, further including masking an area about a peripheral edge of the semiconductor material to define a rim for providing said rigidity.

13. A transducer having a diaphragm fabricated in accordance with the method of claim 1.

14. A method for fabricating semiconductor diaphragms adapted for use in transducer apparatus, comprising the steps of:
   pattering by masking a thin semiconductor wafer on opposing planar sides thereof to define spaced apart diaphragm areas;
   etching the semiconductor wafer a first time to remove exposed semiconductor material to a desired depth to define a setback gap;
   removing the mask; and
   etching the semiconductor wafer on both sides a second time to uniformly remove semiconductor material to a depth for achieving a desired diaphragm thickness substantially independently of said setback gap.

15. The method of claim 14, further including carrying out the second etch with a quaternary ammonium hydroxide to thereby achieve a very smooth surface at least in areas surrounding the diaphragm areas.

16. The method of claim 14, further including preventing an area of said wafer from being etched during said process to thereby provide a degree of rigidity to said wafer.

17. The method of claim 14, further including carrying out said first etch and said second etch with tetramethyl ammonium hydroxide.

18. The method of claim 14, further including etching the semiconductor wafer said first time to achieve a setback gap of about 25 microns, or less, and etching the semiconductor wafer said second time to achieve a diaphragm thickness of about 15 microns.

19. A transducer having a diaphragm fabricated in accordance with the method of claim 14.

20. A method for fabricating a semiconductor material to provide a plurality of uniform diaphragms, comprising the steps of:
   patterning opposing surfaces of a semiconductor wafer with a mask to define a plurality of diaphragm areas;
   etching both sides of the semiconductor wafer at the patterned areas to define a desired setback depth;
   removing the etch mask; and
   micromachining both sides of the semiconductor wafer to achieve a desired diaphragm thickness and to provide semiconductor support areas surrounding each said diaphragm with a surface adapted for electrostatic sealing.

21. The method of claim 20, further including patterning, etching and micromachining a silicon semiconductor wafer.

22. The method of claim 20, further including micromachining said semiconductor wafer with a quaternary ammonium hydroxide etchant.

23. The method of claim 20, further including etching both sides of the semiconductor wafer to achieve a setback depth of less than about 50 microns.

24. The method of claim 20, further including micromachining the semiconductor wafer to achieve a diaphragm thickness of about 10 microns, or less.

25. A method for fabricating semiconductor diaphragms adapted for use in transducer apparatus, comprising the steps of:

masking a wafer of material to define plural diaphragm areas; and processing said wafer to form thin diaphragm areas and thicker areas peripheral to each said diaphragm area.

26. The method of claim 25, further including processing opposing sides of said wafer with essentially identical steps to form said diaphragm areas.

27. The method of claim 26, further including etching a masked said wafer to define a setback dimension of each said diaphragm area, and then etching an unmasked said wafer to define a thickness of each diaphragm area without substantially affecting the setback dimension.

28. The method of claim 27, further including removing substantially all mask material from opposing sides of said wafer for etching said unmasked wafer.

29. The method of claim 28, further including leaving a portion of said wafer masked so as to prevent etching of a portion of said wafer and thereby provide a support structure to enhance rigidity of said wafer.

30. The method of claim 29, further including processing a semiconductor wafer having a diameter greater than about three inches.

31. A semiconductor wafer having plural diaphragms fabricated in accordance with the method of claim 23.

32. A method for fabricating transducer diaphragms, comprising the steps of:
forming a bilayer wafer of semiconductor material having a p-type material layer and an n-type material layer;
removing one said material layer to form a thin semiconductor layer;
patterning by masking said thin layer to define diaphragm areas;
etching said thin layer to form a setback gap;
removing said patterning mask; and
uniformly etching said unmasked thin layer until a desired diaphragm thickness is achieved.

33. The method of claim 32, wherein said bilayer is formed by growing an epitaxial layer of semiconductor material on a single crystal semiconductor wafer.

34. The method of claim 32, wherein said bilayer is formed by diffusing an impurity of a first type into a semiconductor wafer of a second type.

35. The method of claim 32, wherein said masking step is carried out by forming and patterning silicon dioxide.

36. The method of claim 35, further including etching said semiconductor material with a quaternary ammonium hydroxide.

37. The method of claim 36, further including forming said bilayer with an epitaxial n-type layer.

38. The method of claim 32, further including masking an area of said material layer to prevent removal thereof, thereby enhancing rigidity of said thin layer.

39. A semiconductor wafer fabricated for use with transducers, comprising:
a plurality of diaphragm areas defined in said semiconductor wafer; and
a removable punch-out area associated with each said diaphragm, said punch-out area having a peripheral thinned area and a central unthinned area so as to be easily fractured when pressure is applied to the central part of said punch-out area.

40. The semiconductor wafer of claim 39, wherein said removable punch-out area includes a circular trench formed in said wafer.

41. The semiconductor wafer of claim 40, further including a pair of aligned trenches formed in opposing surfaces of said wafer.

42. The semiconductor wafer of claim 39, wherein said peripheral thinned area has a thickness substantially the same as a thickness of said diaphragm area.

43. A processed wafer, comprising:
a wafer having a plurality of first areas defining a plurality of diaphragm areas spaced about said wafer, said diaphragm areas being defined as recessed areas in said wafer and thinned to define a diaphragm thickness, and a second area defining a support area surrounding each said diaphragm area and having a thickness greater than said diaphragm thickness, and a third area having a thickness greater than said second area for providing rigidity to said wafer to enhance handling thereof, said first, second and third areas being formed from the same said wafer.

44. The wafer of claim 43, wherein said third area defines a support structure formed in a matrix about said wafer.

45. The wafer of claim 43, wherein said third area defines a ring around a peripheral edge of said wafer.

46. The wafer of claim 43, wherein said wafer material comprises silicon.

47. The wafer of claim 46, further including an electrical contact formed in association with each said diaphragm.

48. The wafer of claim 46, further including a pair of electrical contacts formed in association with each said diaphragm.

49. The wafer of claim 46, further including a p-n junction formed in association with each said diaphragm.

50. The wafer of claim 43, further including a plurality of holes formed through said wafer.

51. The wafer of claim 50, further including forming said diaphragms in wafer areas so as to define a die, and forming said holes at a common corner of said die.

52. The wafer of claim 43, further including micromachined support areas.

53. A method for fabricating diaphragms adapted for use in transducer apparatus, comprising the steps of:
masking a wafer of material to define diaphragm areas;
processing said wafer to form thin diaphragm areas and thicker areas peripheral to each said diaphragm area; and
processing said wafer to form a rigid support area to said thin wafer for handling, said rigid support being thicker than said areas peripheral to said diaphragms to thereby provide said wafer with rigidity for handling purposes.

54. The method of claim 53, further including processing a semiconductor wafer having a beginning thickness of no more than about 40 mils.

55. The method of claim 53, further including processing a single crystal silicon wafer.

56. The method of claim 55, further including masking a predefined area of said silicon material with silicon dioxide, and leaving said silicon dioxide mask on the wafer throughout the processing steps so that masked silicon areas are not thinned and said wafer retains a certain amount of rigidity.

57. The method of claim 53, further including masking a peripheral edge of said wafer to prevent etching to thereby provide a circumferential support to said wafer.

58. The method of claim 53, further including masking portions of opposing sides of said wafer to prevent removal of wafer material.

59. A transducer fabricated in accordance with the method of claim 53.

60. A processed wafer, comprising:
a wafer having a plurality of areas defining diaphragms;
a plurality of areas circumscribing said diaphragm areas which are electrostatically sealable to other material surfaces; and
a support rim circumscribing said wafer, said rim being thicker than the areas circumscribing the diaphragm areas to enhance rigidity thereof.

61. The processed wafer of claim 60, wherein said wafer comprises silicon.

62. The processed wafer of claim 60, further including holes formed through said wafer so that when said wafer is sandwiched to another material wafer, access can be made through said holes to said other material wafer.

63. The processed wafer of claim 60, further including micromachined areas to provide electrostatically sealable surfaces.

64. A semiconductor wafer, comprising:
a wafer of epitaxial semiconductor material substantially unsupported in a central region thereof by other material layers, said wafer having epitaxial semiconductor material on opposing faces thereof and uniform epitaxial semiconductor material therethrough.

65. The semiconductor wafer of claim 64, further including a support for enhancing rigidity of said wafer.

66. The semiconductor wafer of claim 65, wherein said support comprises single crystal non-epitaxial silicon material.

67. The semiconductor wafer of claim 66, wherein said epitaxial wafer is doped with a first conductivity type impurity, and said support is doped with a different conductivity type impurity.

68. The semiconductor wafer of claim 65, wherein said wafer has a thickness of less than about 50 microns.

69. The semiconductor wafer of claim 64, wherein said wafer is doped with an impurity.

70. The semiconductor wafer of claim 64, wherein said epitaxial wafer has formed therein a plurality of transducer diaphragms.

71. The semiconductor wafer of claim 64, wherein said epitaxial wafer has a diameter greater than about three inches.

72. A method for forming uniform thickness semiconductor wafers, comprising the steps of:
forming an epitaxial layer of uniform thickness silicon material on a single crystal silicon substrate wafer; and
removing the single crystal substrate wafer material thereby leaving said epitaxial silicon material.

73. The method of claim 72, further including forming a support to said epitaxial silicon material to enhance rigidity thereof.

74. The method of claim 72, further including forming said layer and said wafer of different conductivity type impurities.

75. The method of claim 74, further including electroetching said composite structure so as to selectively remove said wafer material without substantially removing said epitaxial material.

76. The method of claim 75, further including masking a portion of said wafer so as to be insensitive to said electroetch, thereby forming said support to said epitaxial material.

77. The method of claim 75, further including etching said wafer material with a quaternary ammonium hydroxide etchant.

78. The method of claim 77, further including forming an alkali metal on a face of said epitaxial material.

79. A method for processing a reinforced semiconductor wafer, comprising the steps of:
forming an epitaxial semiconductor layer of a first conductivity type on a semiconductor substrate wafer of a second conductivity type;
masking areas of the substrate wafer desired to be etch protected and masking substantially the entire surface area of the epitaxial layer, thereby defining a support structure to said wafer;
removing the unmasked areas of the substrate wafer until the epitaxial first type conductivity semiconductor material is exposed on the etched face; and
processing said first conductivity type semiconductor layer for forming elements therein.

80. The method of claim 79, further including forming a substrate wafer ring around a peripheral edge of said semiconductor layer to provide rigidity thereto.

81. The method of claim 79, further including preparing said epitaxial layer for forming diaphragms therein, whereby said epitaxial layer is formed to a thickness of about that of a desired diaphragm thickness plus about twice a desired gap depth.

82. The method of claim 79, further including carrying out the step of removing the unmasked area of substrate wafer with an etch which is selective with respect to the first and second conductivity types of semiconductor material.

83. The method of claim 79, further including fixing a glass substrate of a given diameter to an unrimmed side of said semiconductor layer, and fixing another glass substrate of a smaller diameter to a rimmed surface of said layer.

84. The method of claim 83, further including fixing glass substrates to said epitaxial layer which are substantially thicker than a diaphragm area of said layer.

85. A transducer, comprising:
a conductive capacitor plate;
a semiconductor diaphragm defining a deflectable capacitor plate spaced apart from said fixed capacitor plate; and
a support structure encircling said semiconductor diaphragm and attached thereto for maintaining said deflectable diaphragm radially tensioned a predefined amount.

86. The transducer of claim 85, further including a support substrate for supporting said fixed capacitor plate with respect to said deflectable diaphragm.

87. The transducer of claim 86, wherein said support substrate comprises said support structure which also maintains said semiconductor diaphragm tensioned.

88. The transducer of claim 87, further including a thick semiconductor material circumscribing said diaphragm, and said support substrate maintains said diaphragm tensioned through said thick semiconductor material.

89. The transducer of claim 86, wherein said support substrate has a thickness greater than about 20 mils.

90. The transducer of claim 85, further including a pair of said support structures, each supporting a fixed capacitor plate with respect to said deflectable diaphragm.

91. The transducer of claim 85, wherein said semiconductor diaphragm comprises silicon.

92. The transducer of claim 85, wherein said support structure and said semiconductor diaphragm are constructed of materials having different thermal expansion and contraction properties so that a predefined tension can be imparted to said diaphragm.

93. The transducer of claim 85, wherein said diaphragm has a thickness less than about 20 microns.

94. In a transducer of the type having a diaphragm which is deflectable in response to an input, the improvement comprising:
  a diaphragm constructed of a semiconductor material; and
  a mechanism for maintaining said diaphragm in a tensioned state such that said diaphragm is substantially radially flat in the absence of said input.

95. The improved transducer of claim 94, wherein said tensioning mechanism comprises a first material having a defined thermal expansion fixed with respect to a semiconductor material from which said diaphragm is formed, said semiconductor material having a different thermal expansion.

96. The improved transducer of claim 95, further including an electrostatic seal between said first material and said semiconductor material.

97. The improved transducer of claim 95, wherein said first material comprises glass, and said semiconductor material comprises silicon.

98. The improved transducer of claim 94, wherein said tensioning mechanism comprises a net transfer of volumetric material such that such diaphragm is tensioned.

99. The improved transducer of claim 94, wherein said tensioning mechanism comprises a pretensioned diaphragm affixed to a support structure such that the diaphragm remains tensioned thereafter.

100. The improved transducer of claim 94, wherein said semiconductor diaphragm is formed on a wafer with a plurality of other diaphragms, each transducer being fabricated substantially simultaneously with a pretensioned diaphragm.

101. The improved transducer of claim 94, wherein said diaphragm is constructed of a silicon semiconductor material.

102. A multiple transducer structure, comprising:
  a top support substrate;
  a bottom support substrate;
  a semiconductor wafer having a plurality of recessed areas defining diaphragms, said wafer being sandwiched between said top and bottom support substrates;
  a tension in each said diaphragm; and
  an electrostatic seal substantially circumscribing each said diaphragm to said top and bottom support substrates.

103. The transducer structure of claim 102, wherein said semiconductor wafer includes a plurality of holes therethrough for providing access to said bottom support substrate.

104. The transducer structure of claim 102, further including conductive paths defining a sealing grid on the top and bottom support substrates.

105. The transducer structure of claim 102, wherein said top and bottom support substrates both comprise a glass having a different thermal expansion characteristic then that of said semiconductor wafer in a temperature range in which the transducer is fabricated.

106. The transducer structure of claim 105, wherein said glass support substrates are substantially thicker than said semiconductor wafer.

107. A method for fabricating a pretensioned diaphragm, comprising the steps of:
  fabricating a diaphragm structure from a first type of material;
  fabricating a support structure from a different second type of material;
  changing the temperature of said first and second types of material such that each said material undergoes a different dimensional change; and
  fixing said diaphragm structure to said support structure and allowing said composite structure to return to a quiescent temperature such that said diaphragm remains in tension.

108. The method of claim 107, further including changing the temperature of said first and second materials such that said diaphragm material contracts to a greater extent than that of said support structure.

109. The method of claim 107, further including heating said first material and second material such that said diaphragm material expands to a greater extent than that of said support material.

110. The method of claim 107, further including heating a silicon material and a borosilicate glass such that said silicon expands to an extent great than that of said borosilicate glass, fixing said materials together, and allowing the materials to cool such that said silicon material contracts to a greater extent than that of said borosilicate glass to thereby allow said silicon to remain in tension after said cooling.

111. A transducer having a pretensioned diaphragm, comprising:
  a pair of thick support substrates each having a predefined thermal expansion characteristic;
  a diaphragm fabricated from a material having a thermal characteristic different from that of said support substrates and being substantially thinner than said support substrates such that the thermal expansion characteristics of said support substrates predominate and such that when the temperature of said substrates and said diaphragm is changed and then the substrates and diaphragm are sandwiched and fixed together and said temperature is again changed, said diaphragm remains fixed in a tensioned state.

112. The transducer of class 111, wherein said support substrates comprise glass, and said diaphragm structure comprises a semiconductor material.

113. The transducer of claim 111, wherein said diaphragm structure is fixed between said support substrates by an electrostatic seal.

114. The transducer of claim 111, wherein said diaphragm structure includes a peripheral support area fixed to said support substrates, and a thinner flexible membrane area.

115. The transducer of claim 111, further including a diaphragm having a thickness less than about 20 microns and said support substrates have a thickness greater than about 20 mils.

116. A method for tensioning a diaphragm, comprising the steps of:
  sandwiching together a support material and a diaphragm material;

applying an electrical potential to said sandwiched structure such that an electric field is formed therein and a substantially permanent movement of ions occurs in one or the other of said materials such that said diaphragm experiences a radial stress; and fixing said support material to said diaphragm material such that said radial stress in said diaphragm is maintained.

117. The method of claim 116, further including raising the temperature of said support material and said diaphragm material to effect a bond and thereby fix said materials together.

118. The method of claim 116, further including selecting a support material having slow moving ions and fast moving ions in response to said electrical potential to thereby effect said movement of atoms.

119. The method of claim 118, further including selecting said support material as glass having fast moving sodium ions and slower moving oxygen ions.

120. The method of claim 116, further including forming plural diaphragms in said diaphragm material, and forming relief zones between said diaphragms such that a material compression due to said moving ions is concentrated with respect to the individual diaphragms.

121. The method of claim 120, further including forming conductive paths on said support material and between said diaphragms to thereby concentrate said material compression with respect to the individual diaphragms.

122. The method of claim 120, further including forming grooves in said support material and between said diaphragms to thereby concentrate said material compression with respect to the individual diaphragms.

123. The method of claim 116, further including sandwiching a borosilicate glass support material to a semiconductor diaphragm material.

124. The method of claim 123, further including sandwiching a borosilicate glass composition having about 80% $SiO_2$, 13% $B_2O_3$, 2% $Al_2O_3$, 4% $Na_2O_3$, 0.5% $Sb_2O_3$ and 0.25% $As_2O_3$, together with a silicon semiconductor diaphragm material.

125. The method of claim 116, further including placing an electrode on said support material at least partially circumscribing said diaphragm to provide an electrostatic sealing conductor.

126. The method of claim 116, further including locating a conductor around a boundary of said diaphragm material for confining a compression region adjacent said diaphragm.

127. The method of claim 126, further including forming plural diaphragms in said diaphragm material, and forming a boundary conductor between said diaphragms to localize and confine material compression regions to respective diaphragms areas.

128. The method of claim 116, wherein said fixing step is carried out by electronstatically sealing glass support material to silicon diaphragm material.

129. A transducer diaphragm fabricated in accordance the method of claim 116.

130. A method for fabricating tensioned diaphragms, comprising the steps of:
forming a plurality of thin diaphragms in a semiconductor wafer;
forming a rim around said wafer with material having a thermal expansion characteristic different than that of said semiconductor wafer; and
changing the temperature of the rimmed wafer such that said rim expands to an extent greater than the wafer material to thereby form a tension in each said diaphragm.

131. The method of claim 130, further including forming said rim with a glass material and electrostatically sealing said glass to said semiconductor wafer.

132. The method of claim 130, further including forming said rim with a substrate wafer material having a doping level different than that of said semiconductor wafer.

133. The method of claim 130, further including electrostatically sealing said pretensioned wafer between a pair of glass insulator substrates.

134. The method of claim 152, further including electrostatically sealing said semiconductor wafer around each said diaphragm between said pair of glass insulator substrates.

135. The method of claim 130, further including forming said rim on each side of said semiconductor substrate and processing said semiconductor wafer on both sides thereof to form said diaphragms.

136. A pretensioned wafer fabricated in accordance with the method of claim 130.

137. A method for tensioning a diaphragm, comprising the steps of:
utilizing a diaphragm material having a thermal expansion property in an operating temperature range and a thermal expansion property in a fabrication temperature range;
utilizing a support material having a given thermal expansion property substantially the same as that of said diaphragm material in the operating temperature range, and a thermal expansion property different than that of the diaphragm material in said fabrication temperature range;
changing the temperature of said diaphragm material and of said support material to a fabrication temperature and fixing said diaphragm to said support material; and
again changing the temperature of the composite diaphragm material and said support material so that said diaphragm material contracts more than said support material to thereby impart a tension to said diaphragm.

138. The method of claim 137, further including fixing a silicon diaphragm material to a glass support material.

139. The method of claim 138, further including elevating the temperature of said silicon and said glass until said glass is elastically deformable.

140. The method of claim 139, further including applying a voltage between said silicon and said glass to form an electrostatic seal between said silicon and said glass.

141. The method of claim 137, further including fixing said diaphragm to said support material by electrostatically sealing at said fabrication temperature.

142. The method of claim 137, wherein said diaphragm is tensioned during said fixing step.

143. The method of claim 137, wherein said diaphragm is tensioned during the step where the temperature of said diaphragm and said support material is again changed.

144. The method of claim 137, further including fixing said support material to opposing sides of said diaphragm material.

145. The method of claim 137, further including placing an electrostatic sealing conductor electrode on said support material at least partially circumscribing said diaphragm to facilitate the formation of an electrostatic seal around said diaphragm.

146. The method of claim 145, further including placing a conductor on said support material in the neighborhood of said diaphragm material for confining a material compression region adjacent said diaphragm.

147. The method of claim 146, further including forming plural diaphragms in said diaphragm material, and forming a boundary conductor on said support material between said diaphragms to localize and confine material compression regions to respective diaphragm areas.

148. A transducer diaphragm structure fabricated in accordance to the method of claim 137.

149. A method for fabricating a transducer structure, comprising the steps of:
sandwiching a semiconductor wafer between a top and bottom insulator substrate such that a diaphragm formed in said wafer is spaced apart from capacitor plates formed on said top and bottom insulator substrates; and
applying an electrostatic sealing voltage to conductive paths on said top and bottom insulator substrate such that a cylindrical electrostatic field is concentrated circumferentially around said diaphragm and said silicon material circumscribing said diaphragm is sealed to said top and bottom insulator substrates.

150. The method of claim 149, further including applying a sealing voltage to a grid network such that a peripheral area around said transducer structure is electrostatically sealed.

151. The method of claim 149, further including applying a sealing voltage to a substrate C-shaped sealing ring located above and below said diaphragm.

152. The method of claim 149, further including connecting said capacitor plates to said semiconductor material by a conductive path during said sealing operation.

153. The method of claim 149, further including applying a sealing voltage to a circular conductive path to form a circular cylindrical electrostatic field.

154. A transducer structure, comprising:
a top insulator substrate;
a capacitor plate;
a bottom insulator substrate;
the semiconductor wafer having a diaphragm, said wafer being electrostatically bonded between said top and bottom insulator substrates; and
a conductive sealing grid network adjacent a top surface of said top substrate and a conductive sealing grid network adjacent a bottom side of said bottom insulator substrate such that a voltage can be applied under predefined temperature conditions to both said sealing grid networks such that an electrostatic seal is effected on opposing wafer surfaces and circumferentially around said diaphragm.

155. The transducer structure of claim 154, wherein said conductive sealing grid comprises paths which are circular in shape with an inside diameter generally larger than a diameter of said diaphragms.

156. The transducer structure of claim 154, wherein each said circular conductive sealing path has a break therein for allowing a conductor path to be routed from outside said circular path to a central location within said sealing path.

157. The transducer structure of claim 156, wherein the respective breaks of said circular sealing paths on the top and bottom substrates are misaligned.

158. The transducer structure of claim 154, further including other conductor sealing paths located at peripheral edges of said transducer structure.

159. The transducer structure of claim 154, wherein said semiconductor wafer is electrostatically sealed directly to said top and bottom insulator substrates.

160. The transducer structure of claim 154, wherein said sealing grid networks are formed on respective top and bottom sides of said insulator substrates.

161. A transducer structure, comprising:
glass and semiconductor layers electrostatically sealed together;
a capacitor plate;
a deflectable diaphragm formed in said semiconductor layer;
a conductive sealing grid to which a voltage is applied for achieving said electrostatic seal; and
a conductive grid for connecting said capacitor plate to said semiconductor material during an electrostatic sealing process.

162. The transducer structure of claim 161, wherein said conductive interconnecting grid interconnects plural capacitor plates together at a common location.

163. The transducer structure of claim 162, wherein said common location comprises a contact which when sectioned therethrough provides a capacitor plate edge contact to each associated transducer.

164. The transducer structure of claim 162, wherein said common location comprises a square contact area connecting four capacitor plates.

165. The transducer structure of claim 161, further including plural said transducer structures, each having said sealing grids connected together.

166. The transducer structure of claim 161, wherein said sealing grid comprises a circular conductive path for concentrating an electric field around said diaphragm.

167. The transducer structure of claim 161, further including a sealing grid path adjacent a peripheral edge of said structure.

168. A method for electrostatically sealing material layers together, comprising the steps of:
forming a plurality of device structures on at least one of the material layers;
sandwiching together the material layers to be electrostatically sealed; and
concentrating an electric field with respect to each said device structure such that ion movement within at least one of the layers is confined to each device structure.

169. The method of claim 168, further including forming conductive paths on one said material layer for concentrating the electric field.

170. The method of claim 168, further including clamping said sandwiched layers in a plate-like structure having a grid network for concentrating the electric field.

171. The method of claim 168, further including electrosealing glass and semiconductor layers together so that sodium ions are concentrated at predefined locations.

172. The method of claim 168, further including forming plural transducer devices on corresponding die of glass and semiconductor layers.

173. The method of claim 172, further including forming conductive paths within boundaries of each said die so that the movement of ions are concentrated within each said die.

174. The method of claim 172, further including forming conductive paths on boundaries of each said die.

175. The method of claim 172, further including forming conductive paths to define electric field paths such that ion movement is away from diaphragms to thereby impart a tension to said diaphragms.

176. The method of claim 175, further including concentrating the ion movement within the respective die so that each said diaphragm is tensioned independently of the other diaphragms.

177. Electrostatic sealing apparatus for carrying out the method of claim 168.

178. A multilayer transducer structure, comprising:
a top glass substrate;
a bottom glass substrate;
a semiconductor wafer sandwiched between said top and bottom glass substrates, said semiconductor wafer including a clamped diaphragm spaced apart from said top and bottom glass substrates to define respective capacitor gaps, said semiconductor wafer further including a contact on an upper surface thereof for providing electrical connections to said semiconductor wafer;
said top glass substrate including a top capacitor plate formed on an under surface thereof, and a hole therein, and a conductor path connected to said top capacitor plate, routed through said hole and to a top side of said top glass substrate; and
said bottom glass substrate including a hole therein for communicating fluid pressure to said diaphragm, and a conductive bottom capacitor plate formed on a top surface of said bottom glass substrate connected by a conductor path through said hole to an undersurface of said bottom glass substrate, to an edge thereof and around said edge to a top surface of said bottom glass substrate.

179. The multilayer transducer structure of claim 178, wherein said top and bottom glass support substrates and said semiconductor wafer are constructed with substantially identical length and width, and further including a cutout in said top glass support substrate for allowing access to said semiconductor contact, and further including aligned cutouts in said top glass support substrate and said semiconductor wafer for allowing access to said conductor path on said bottom glass support substrate contacts.

180. The multilayer transducer structure of claim 178, wherein said top glass support substrate and said bottom glass support substrate have conductors extending from said capacitor plates to respective corners of said support substrates to thereby facilitate fabricating a plurality of said support substrates from a glass substrate layer.

181. The multilayer transducer structure of claim 178, further including a conductive via formed in each said glass support substrate for connecting said respective capacitor plates to conductive areas on other sides of said respective said glass support substrates.

182. A method for fabricating a three layer transducer structure, comprising the steps of:
forming a diaphragm in a material which is at least semiconductive;
sandwiching said diaphragm material between a top insulator and a bottom insulator;
forming a pair of capacitor plates on respective surfaces of said top insulator and said bottom insulator so as to be adjacent said diaphragm;
forming holes in said top and bottom insulators wafers for allowing a fluid pressure to deflect said diaphragm;
forming a top side contact on said top insulator and electrically connected to one said capacitor plate;
forming a top side contact to said diaphragm material and forming a cutout in said top insulator wafer for allowing access to said top side diaphragm material contact; and
forming a top side contact on said bottom insulator wafer in electrical contact with the other said capacitor plate, and forming cutouts in said top insulator and said diaphragm material for allowing access to said top side contact of said bottom insulator.

183. The method of claim 182, further including providing said cutouts at edges of said respective wafers and insulators.

184. The method of claim 182, further including coating ones of said cutouts with a conductive material to provide electrical connection from one side of an insulator to another side of the insulator.

185. The method of claim 182, further including forming plural said multilayer transducer structures having a common corner, and forming a conductive via at said common corner, and separating said plural multilayer transducer structures through said conductive corner to provide top side to bottom side conductive paths to each said separated multilayer transducer structure.

186. The method of claim 182, further including forming a sealing grid structure on said top insulator and a sealing grid structure on said bottom insulator for use in electrostatically sealing said top and bottom insulators to said diaphragm material.

187. The method of claim 182, further including forming a conductive material on opposing sides of said top insulator through a hole in said top insulator, a top conductive surface thereof defining a top contact and a bottom conductive surface defining the top capacitor plate.

188. The method of claim 182, further including forming a conductor material on opposing sides of said bottom insulator through a hole therein and around an edge of said bottom insulator, a first top surface of the conductive material defining a top contact of said bottom insulator and a second top surface of the conductive material defining said bottom capacitor plate.

189. The method of claim 188, wherein the step of forming said conductor material around said edge is carried out by forming a hole in said bottom insulator, covering sidewalls of said hole with said conductive material and cutting through said conductive hole to separate such transducer structure.

190. The method of claim 182, further including forming said diaphragm contacts by depositing a conductive material through said cutouts in said top insulator wafer onto said diaphragm material.

191. The method of claim 190, further including placing an apertured plate over said top insulator wafer and sputtering a conductive material through said apertures and onto said diaphragm material for forming electrical contacts thereto.

192. The method of claim 191, further including forming a pair of electrical contacts on said diaphragm material through said top insulator wafer cutouts.

193. A multilayer transducer, comprising:
a top insulator substrate;
a bottom insulator substrate;
an intermediate wafer sandwiched between said top and bottom substrates, said intermediate wafer including a diaphragm spaced apart by gaps from said top and bottom glass substrates;
a conductive top capacitor plate formed on an under surface of said top substrate;
a conductive bottom capacitor plate formed on a top surface of said bottom glass substrate,
a contact formed on a top side of said bottom insulator substrate electrically connected to said bottom capacitor plate;
a contact formed on a top surface of said intermediate wafer;
a cutout in said intermediate wafer providing access to said top side contact on said bottom insulator substrate;
a first cutout in said top insulator substrate providing access to said bottom capacitor plate contact; and
a second cutout in said top insulator substrate providing access to said intermediate wafer contact.

194. The mutlilayer transducer of claim 193, wherein said cutouts in said top insulator substrate are located in corners thereof.

195. The multilayer transducer of claim 193, wherein the cutout in said top insulator substrate is larger than a cutout in said intermediate wafer aligned vertically therewith.

196. The multilayer transducer of claim 193, further including a contact on a top surface of said top insulator substrate for providing contact to said top capacitor plate.

197. The multilayer transducer of claim 193, further including a pair of spaced apart contacts formed on said intermediate wafer for measuring resistance thereof.

198. The multilayer transducer of claim 193, wherein said intermediate wafer comprises a semiconductor material, and further including a p-n junction formed therein, and a pair of contacts providing external contact to said junction.

199. The multilevel transducer of claim 193, further including a plated through via in said bottom insulator substrate providing an electrical connection between said bottom capacitor plate and a bottom land area, and a conductor connecting said bottom land area to an edge of said bottom insulator substrate, around an edge thereof and to said top side contact.

200. A method for fabricating a multilayer transducer having a semiconductor diaphragm, comprising the steps of:
forming a diaphragm in a semiconductor layer;
forming a capacitor plate on an upper and lower insulator substrate;
sandwiching said semiconductor layer between said upper and lower insulator substrates so that said diaphragm is spaced apart from said capacitor plates;
forming electrical contacts to said capacitor plates and to said semiconductor layer; and
forming a second electrical contact to said semiconductor layer for allowing electrical measurements of said semiconductor material to determine parameters thereof.

201. The method of claim 200, further including forming said semiconductor layer contacts spaced apart so that a resistance of said semiconductor material can be measured.

202. The method of claim 201, further including forming a p-n junction between said first and second contacts of said semiconductor material.

203. A method for processing a semiconductor material for forming transducer diaphragms, comprising the steps of:
forming a plurality of quadrature unit cells symmetrically oriented on a semiconductor wafer, each said cell being defined by plural non-symmetrically oriented die, and forming a diaphragm in each said die.

204. The method of claim 203, further including forming a removable semiconductor area at a corner of each said die, said removable area being adapted for forming a hole through said semiconductor wafer.

205. The method of claim 204, further including forming said removable area by forming symmetrical trenches on each side of said wafer so as to form an intermediate thinned area which is easily broken for removal thereof.

206. The method of claim 203, further including forming an electrical contact associated with each said die.

207. The method of claim 203, further including forming a pair of spaced apart electrical contacts on each said die so that electrical parameters of said semiconductor material can be measured.

208. The method of claim 203, further including micromachining the semiconductor wafer to achieve a diaphragm thickness of about 10 microns, or less.

209. A method for processing a material layer for forming multilayer transducers, comprising the steps of:
forming a plurality of multiple unit cells in a material layer, each said cell being substantially symmetrically oriented on said layer with respect to each other; and
forming each said cell as a plurality of similar die, and each die of a cell being oriented differently with respect to the other die of the cell, and the plural die for each said cell being oriented substantially symmetrical with the die of the other cells.

210. The method of claim 209, further including forming diaphragms in a semiconductor layer.

211. The method of claim 210, further including forming a hole in a corner of each said diaphragmed die.

212. The method of claim 210, further including forming electrical contacts on said semiconductor layer after said material layer is fixed between other insulator layers.

213. The method of claim 212, further including forming access holes in at least one said insulator layer for exposing areas of said semiconductor layer, and depositing a conductive material through said access holes onto said semiconductor layer.

214. The method of claim 209, further including forming capacitor plates on a glass substrate layer.

215. The method of claim 209, further including forming a hole in said material layer which is common to multiple said cells.

216. The method of claim 215, further including forming said hole at a corner of said multiple of cells.

217. The method of claim 215, further including forming a hole in said material layer which is common to plural die each of which is associated with a different said cell.

218. The method of claim 209, further including forming a conductive via central to each said die connected to a conductive capacitor plate.

219. The method of claim 218, further including forming a hole at three corners of each said die to define a top substrate layer of a transducer.

220. The method of claim 218, further including forming a conductive via at a corner of each said die, and connecting said corner via and said central via with a conductor.

221. A transducer structure, comprising:
a plurality of multiple unit cells in a material layer, each said cell being substantially symmetrically oriented on the layer with respect to each other; and
said cells each comprising a plurality of similar die, and each die of a cell being oriented differently with respect to the other die of the cell, and the plural die of each said cell being oriented substantially symmetrical with the die of the other cells.

222. A transducer structure of claim 221, wherein said material layer comprises a semiconductor material.

223. The transducer structure of claim 222, further including a hole formed in a corner of each die having a diaphragm.

224. The transducer structure of claim 221, wherein said material layer comprises a glass substrate layer.

225. The transducer structure of claim 221, further including a hole in said material layer which is common to multiple said cells.

226. The transducer structure of claim 225, further including a hole formed at a corner of said multiple of cells.

227. The transducer structure of claim 225, further including a hole formed in said material layer, said hole being common to plural die each of which is associated with a different said cell.

228. The transducer structure of claim 221, further including a conductive via formed central to each said die, said via being connected to a conductive capacitor plate.

229. The transducer structure of claim 228, further including a hole formed at three corners of each said die to define a top substrate layer of said transducer structure.

230. The transducer structure of claim 228, further including a conductive via formed at a corner of each said die, and a conductive path connecting said corner via to an associated central via.

231. In a trilevel transducer structure, a quadrature unit cell, comprising:
a top insulator substrate having quadrants defining four die, said quadrants having four corners, each with a large hole formed therein and an intermediate size hole located between each said large hole, and a small size hole substantially centered in each said die, a conductive land area connected by a path through each said small hole to a conductive capacitor plate, each said land area being connected together by a conductive path to a conductive pad centered in each quadrant;
a bottom insulator substrate having quadrants defining four die, said quadrants having four corners, each with a first conductive via connected to a second conductive via which is substantially centered in each said die, said centered via being connected to a conductive capacitor plate; and
a semiconductor wafer sandwiched between said top and bottom insulator substrates, said semiconductor wafer having a quadrant defining four die, said wafer quadrants having four corners each with a hole, and each wafer quadrant having a diaphragm substantially centered in each said die, and an electrical contact connected to the semiconductor material of each said die.

232. The trilevel transducer structure of claim 231, wherein said corner hole in said semiconductor wafer has a diameter intermediate that of the corner via in said bottom substrate and said large corner holes in said top insulator substrate to define a stepped hole structure.

233. The trilevel transducer structure of claim 231, further including a pair of contacts located at diagonal corners of each said wafer die, said contacts being aligned with the intermediate size holes in said top insulator substrate.

234. The trilevel transducer structure of claim 233, further including a p-n junction formed between said wafer contacts.

235. The trilevel transducer structure of claim 231, further including a sealing conductive path formed at least partially around each said land area of said top insulator substrate, each said sealing conductive path being connected together for facilitating electrostatic sealing of the semiconductor wafer to said top and bottom insulator substrates.

236. The trilevel transducer structure of claim 235, wherein said conductive sealing paths are formed substantially around the central via of each said die.

237. The trilevel transducer structure of claim 236, further including a first sealing voltage pad formed near an edge of said top insulator substrate, said pad being connected to each said conductive sealing path, and a second sealing voltage pad formed adjacent an edge of said bottom insulator substrate, each said pad being connected respectively to said conductive sealing paths of said top and bottom insulator substrate.

238. The trilevel transducer structure of claim 235, wherein said conductive sealing paths of each said cell are connected together at a center location of the respective cells.

239. The trilevel transducer structure of claim 231, further including conductive paths formed along at least a portion of die boundaries for facilitating electrostatic sealing.

240. A method for fabricating a multilayer transducer, comprising the steps of:
fabricating a plurality of transducer structures as a multilayered composite, each said transducer structure sharing at least a portion of an edge thereof with other transducer structures;
forming a conductive via in one or more of said layers; and
sectioning said multilayered structure along said edge and through said conductive via into a plurality of individual transducer devices such that each said device includes a conductive path from a bottom surface to a top surface thereof and around an edge.

241. The method of claim 240, further including sectioning said composite in quadrants such that a portion of said conductive via is located at a corner of each said sectioned transducer device.

242. The method of claim 240, further including forming holes in upper said layers of said composite so as to provide access to electrical contacts formed on layers thereunder.

243. The method of claim 242, further including aligning said holes with said conductive vias so that access can be had through the hole to bottom layers of said structure.

244. The method of claim 243, further including sectioning said layers simultaneously.

245. The method of claim 244, further including forming an access hole larger in diameter than said conductive via.

246. The method of claim 240, further including forming said multilayered structure with holes in upper layers thereof aligned with holes formed in other layers thereunder, said upper layer holes being larger than said aligned holes thereunder.

247. The method of claim 240, further including forming electrical contacts on an intermediate layer of said multilayered composite by forming access holes in a top layer of said composite, overlying said top layer with an apertured stencil plate, and depositing a conductive material over said stencil plate such that said conductive material passes through said access holes and is deposited on said intermediate layer.

248. A multilayer transducer fabricated according to the method of claim 240.

249. A method for fabricating a support substrate adapted for use in constructing transducers, comprising the steps of:
 forming a plurality of small holes in a spaced apart manner through a support substrate material, each said hole defining an aperture for communicating a fluid pressure therethrough;
 forming a plurality of conductive capacitor plates associated with each said small hole;
 forming a plurality of conductive areas on an opposing side of said support substrate material, and each conductive area being associated with a respective said capacitor plate;
 connecting said conductive areas with respective said capacitor plates by a conductive via through said small holes; and
 forming conductive paths from said conductive areas for providing an electrical connection to said capacitor plates.

250. The method of claim 249, further including forming said small holes and capacitor plates in a uniform pattern on said support substrate material so as to define symmetrical groups of die.

251. The method of claim 250, further including forming large holes through said substrate material at a common corner of a plurality of said die.

252. The method of claim 251, further including separating said support material into individual die through said large holes so that each said separated die has a corner portion missing.

253. The method of claim 249, further including forming a C-shaped ring around each said conductive area.

254. The method of claim 253, further including connecting each said C-shaped ring by a grid of conductive paths.

255. The method of claim 249, further including forming a conductive pad electrically connected to a plurality of said conductive paths, and separating said support substrate material into individual die so that a portion of said conductive pad is located at an edge of each said separated die.

256. A transducer structure, comprising:
 a top and bottom glass substrate characterized by a composition of weight of about:
 80.4% $SiO_2$
 13.0% $B_2O_3$
 2.0% $AL_2O_3$
 3.8% $Na_2O_3$
 0.5% $Sb_2O_3$
 0.25% $As_2O_3$
 a plurality of capacitor plates;
 a semiconductor wafer with a plurality of diaphragms formed therein;
 said semiconductor wafer being electrostatically sealed between said top and bottom glass substrates so that each said diaphragm is spaced apart from said capacitor plate; and
 conductors providing electrical connections to said capacitor plates and said diaphragms.

257. The transducer structure of claim 256, further including an electrostatic seal around each said diaphragm so as to maintain a tension in said diaphragms.

258. The transducer structure of claim 257, further including a conductive sealing grid on said top and bottom substrates to provide an electrostatic seal at predetermined locations between said semiconductor wafer and said top and bottom glass substrates.

259. The transducer structure of claim 256, further including a conductive network for connecting all said capacitor plates together.

260. The transducer structure of claim 259, further including a contact for providing electrical connections to said semiconductor wafer, such that said capacitor plates can be shorted to said semiconductor wafer during electrostatic sealing.

261. A method for fabricating a composite transducer structure, comprising the steps of:
 fabricating a first and second glass layer, each having a plurality of conductive capacitor plates;
 fabricating a semiconductor wafer having a plurality of thin diaphragm areas;
 registering the capacitor plates of one said glass layer to the diaphragms of said semiconductor wafer and adhering the layers together;
 registering the capacitor plates of the other glass layer to the diaphragms of said semiconductor wafer and adhering the layers together; and
 electrostatically sealing the glass layers to the semiconductor wafer to thereby form a composite transducer structure.

262. The method of claim 261, further including forming a plurality of depressions in said semiconductor wafer and depositing an adherent in said depressions.

263. The method of claim 261, further including employing an adherent which can be hardened with ultraviolet light.

264. The method of claim 261, further including adhering the glass layers to a perimeter portion of said semiconductor wafer.

265. The method of claim 261, further including forming electrical contacts on said semiconductor wafer after said electrostatic sealing.

266. The method of claim 265, further including forming holes in one said insulator layer, sputtering a metal therethrough and onto said semiconductor wafer to achieve a electrical contact thereto.

267. A miniature pressure transducer, comprising:

a top insulator having a conductive capacitor plate formed on an under surface thereof;

a bottom insulator having a conductive capacitor plate formed on a top surface thereof;

a semiconductor material sandwiched between said top and bottom insulators, a surface contact providing electrical connections to said semiconductor material, said semiconductor material including a thin diaphragm formed centrally therein and spaced apart from the respective capacitor plates of said top and bottom insulators;

said top and bottom insulators and said semiconductor material having length and width dimensions less than about 500 mils; and conductive paths formed on a top surface of said top insulator and on a bottom surface of said bottom insulator for providing connections to said capacitor plates of said top and bottom insulators.

268. The miniature transducer of claim 267, wherein said top and bottom insulators each include an aperture therethrough for allowing fluid pressure communication to said diaphragm.

269. The miniature transducer of claim 267, wherein said semiconductor material comprises silicon, and said diaphragm is 10 microns or less in thickness.

270. The miniature transducer of claim 267, further including a setback area formed in opposing sides of said semiconductor material for defining a gap between said diaphragm and said top and bottom capacitor plates.

271. The miniature transducer of claim 267, further including a conductor path formed around an edge of said bottom insulator and on a top surface thereof, wherein said conductor path is accessible from a single side of said transducer.

272. The miniature transducer of claim 271, further including recesses in an edge of said semiconductor material and in said top insulator for allowing access to a conductor formed on said bottom insulator.

273. The miniature transducer of claim 267, wherein said transducer includes a radially tensioned diaphragm.

274. The miniature transducer of claim 273, wherein said diaphragm is tensioned as a result of the fabrication of the transducer.

275. A method for forming an electrical surface contact on an internal surface of a multilayer composite, comprising the steps of:

forming a hole in one layer of said multilayer composite to expose a portion of said internal surface;

covering said one layer with an apertured stencil plate and registering said aperture with respect to said hole in said one layer;

depositing a conductive material over a surface of said stencil plate such that the conductive material passes through said aperture and through said hole and is deposited on said internal surface without filling said hole with the conductive material; and removing the stencil plate from the multilayer composite.

276. The method of claim 275, further including forming said apertures in said stencil plate with a diameter smaller than a diameter of the hole in said one layer.

277. The method of claim 38, further including reusing said stencil plate a plurality of times.

278. The method of claim 275, further including forming a plurality of contacts on said internal surface by forming plural apertures in said stencil plate such that said conductive material passes through said plurality of apertures and through a angle said hole in said one layer.

279. The method of claim 278, further including forming a plurality of said holes in said one layer, and forming groups of said plurality of apertures in said stencil plate.

280. A stencil plate for carrying out the method of claim 275.

281. A method for fabricating a multilayered transducer structure, comprising the steps of:

fixing together an insulator layer having holes therein and having a plurality of fixed capacitor plates, with a semiconductor layer having a corresponding plurality of deflectable diaphragms;

covering said insulator layer with an apertured stencil plate, said apertures being registered with said holes in said insulator layer; and depositing a conductive material through said insulator layer holes and through said stencil plate apertures and onto said semiconductor layer to form electrical conductors.

282. The method of claim 281, further including forming a plurality of a plurality of apertures in said stencil plate in association with each said hole in said insulator layer.

283. The method of claim 281, further including employing said stencil plate a plurality of times for fabricating a plurality of said multilayer structures.

284. The method of claim 281, further including fabricating a plurality of said multilayer transducer structures during common processing steps, and forming said contacts after layers of said structure are fixed together.

285. A method of etching a semiconductor wafer, comprising the steps:

patterning the wafer to define areas of exposed semiconductor material to be etched;

removing semiconductor surface oxides by applying an alkaline etchant to the exposed semiconductor areas to provide exposed areas of virgin semiconductor material; and before the developing of further surface oxides on the exposed areas of the semiconductor material, etching the exposed virgin semiconductor areas with a quaternary ammonium hydroxide etchant to achieve a smooth semiconductor surface.

286. The method of claim 285, further including etching the semiconductor wafer with a potassium hydroxide to produce exposed areas of virgin semiconductor material.

287. The method of claim 285, further including etching the virgin semiconductor areas with tetramethyl ammonium hydroxide.

288. The method of claim 285, further including masking the wafer with silicon dioxide to define an etch mask with respect to the quaternary ammonium hydroxide etchant.

289. The method of claim 288, further including etching the semiconductor wafer a first time to remove the silicon dioxide mask, and subjecting the wafer to the alkaline etchant to remove surface oxides and expose said virgin semiconductor material.

290. A method for forming holes in a semiconductor wafer, comprising the steps of:

masking and patterning the semiconductor wafer to define areas for forming the holes therein, said patterning including removing the mask material in a path around each semiconductor area to be removed;

etching the wafer to remove the semiconductor material in the paths so as to form a thinned area circumscribing each central part which is not thinned; and applying a pressure to each central unthinned area so as to fracture the thinned semiconductor material and allow the central parts to be removed.

291. The method of claim 290, further including masking the wafer to form thinned planar diaphragm areas by etching the diaphragm areas to the same extent as said path areas are thinned.

292. The method of claim 290, further including patterning a mask material to form annular rings for the paths of said punch-out areas, and patterning the mask material at other areas to form circular diaphragm areas where the mask material is entirely removed.

* * * * *

UNITED STATES PATENT AND TRADEMARK OFFICE
CERTIFICATE OF CORRECTION

PATENT NO. : 4,996,627

DATED : February 26, 1991

INVENTOR(S) : Arthur R. Zias et al.

It is certified that error appears in the above-identified patent and that said Letters Patent is hereby corrected as shown below:

ON THE TITLE PAGE:

Item [75]

add the name of Philip E. Mauger, Santa Clara, Calif.

Signed and Sealed this

Twelfth Day of January, 1993

*Attest:*

DOUGLAS B. COMER

*Attesting Officer*   *Acting Commissioner of Patents and Trademarks*